US012768364B2

(12) United States Patent
Zheng et al.

(10) Patent No.: US 12,768,364 B2
(45) Date of Patent: Oct. 20, 2026

(54) MOTOR DRIVE CONTROL CIRCUIT, PORTABLE FAN CONFIGURED WITH HIGH-SPEED THREE-PHASE MOTOR, AND CONTROL METHOD OF PORTABLE FAN

(71) Applicant: SHENZHEN JISU TECHNOLOGY CO., LTD, Shenzhen (CN)

(72) Inventors: Guanzheng Zheng, Shenzhen (CN); Haijun Gao, Shenzhen (CN); Jiahang Xie, Shenzhen (CN)

(73) Assignee: SHENZHEN JISU TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 19/031,869

(22) Filed: Jan. 18, 2025

(65) Prior Publication Data

US 2025/0163925 A1 May 22, 2025

Related U.S. Application Data

(63) Continuation of application No. PCT/CN2024/107360, filed on Jul. 24, 2024.

(30) Foreign Application Priority Data

Jul. 24, 2023 (CN) ......................... 202321965090.9

(51) Int. Cl.

*F04D 29/66* (2006.01)
*F04D 27/00* (2006.01)
(Continued)

(52) U.S. Cl.

CPC ......... *F04D 27/004* (2013.01); *F04D 29/661* (2013.01); *H02P 21/05* (2013.01);
(Continued)

(58) Field of Classification Search

CPC ...... F04D 27/004; F04D 29/661; H02P 21/05; H02P 23/04; H02P 7/00; G05B 2219/41121; G10K 2210/11
See application file for complete search history.

(56) References Cited

U.S. PATENT DOCUMENTS

| | | | |
|---|---|---|---|
| 2,770,413 | A | 11/1956 | Grantham et al. |
| 3,086,698 | A | 4/1963 | Goldstein |

(Continued)

FOREIGN PATENT DOCUMENTS

| | | | |
|---|---|---|---|
| CN | 86103286 | A | 1/1987 |
| CN | 2624235 | Y | 7/2004 |

(Continued)

OTHER PUBLICATIONS

Australian First Examination Report, Australian Application No. 2023266955, Australian mailed Feb. 14, 2025 (8 pages).

(Continued)

*Primary Examiner* — Nathaniel E Wiehe
*Assistant Examiner* — Theodore C Ribadeneyra

(57) ABSTRACT

A portable fan configured with a high-speed three-phase motor is provided, the portable fan includes: a control module, a drive module, and the high-speed three-phase motor. The high-speed three-phase motor has an operating voltage of 2V to 18 V and an operating current of 0.1 to 10 A, and/or has a rated operating power of 0.5 to 100 W. The control module is configured to control, via the drive module and based on the operating voltage, the operating current, and/or the rated operating power, a rated operating rotation speed of the high-speed three-phase motor to reduce noise generated due to a high rotation speed of the high-speed three-phase motor and to control an air speed to be within a preset air speed range.

9 Claims, 21 Drawing Sheets

(51) Int. Cl.
*H02P 21/05* (2006.01)
*H02P 23/04* (2006.01)
*H02P 7/00* (2016.01)

(52) U.S. Cl.
CPC .... *H02P 23/04* (2013.01); *G05B 2219/41121* (2013.01); *G10K 2210/11* (2013.01); *H02P 7/00* (2013.01)

(56) References Cited

U.S. PATENT DOCUMENTS

| | | | | |
|---|---|---|---|---|
| 3,099,386 | A | 7/1963 | Pieper | |
| 3,809,504 | A | 5/1974 | Goossens | |
| 4,152,094 | A | 5/1979 | Honda et al. | |
| 4,945,604 | A | 8/1990 | Miner et al. | |
| 6,244,818 | B1 | 6/2001 | Chang | |
| 6,320,286 | B1 | 11/2001 | Ramarathnam | |
| 6,547,540 | B1 | 4/2003 | Horng et al. | |
| 8,368,334 | B2 * | 2/2013 | Kern | H02P 27/085 318/400.34 |
| 8,522,780 | B2 | 9/2013 | Devries et al. | |
| 8,627,819 | B2 | 1/2014 | Devries et al. | |
| 10,304,324 | B2 | 5/2019 | Smith et al. | |
| 10,337,523 | B2 | 7/2019 | Chou | |
| 10,525,371 | B1 | 1/2020 | Hsu | |
| 10,859,287 | B2 | 12/2020 | Yamamoto et al. | |
| 11,566,628 | B1 | 1/2023 | Liu | |
| 2006/0144396 | A1 | 7/2006 | Devries et al. | |
| 2006/0267435 | A1 | 11/2006 | Lin et al. | |
| 2008/0199159 | A1 | 8/2008 | Lee | |
| 2008/0203962 | A1 | 8/2008 | Maeda et al. | |
| 2012/0051904 | A1 | 3/2012 | Hagen et al. | |
| 2012/0068649 | A1 | 3/2012 | Krishnamoorthy et al. | |
| 2012/0268047 | A1 | 10/2012 | Suzuki et al. | |
| 2012/0286715 | A1 | 11/2012 | Nakajima et al. | |
| 2013/0177859 | A1 | 7/2013 | Prior et al. | |
| 2014/0178209 | A1 | 6/2014 | Smith et al. | |
| 2015/0145444 | A1 | 5/2015 | Reed et al. | |
| 2015/0303842 | A1 | 10/2015 | Takano et al. | |
| 2016/0076547 | A1 | 3/2016 | Chu et al. | |
| 2016/0265540 | A1 | 9/2016 | Tirone et al. | |
| 2016/0298635 | A1 | 10/2016 | Su et al. | |
| 2016/0305452 | A1 | 10/2016 | Nakagawa et al. | |
| 2017/0021489 | A1 | 1/2017 | Bylund et al. | |
| 2017/0047834 | A1 | 2/2017 | Chan | |
| 2017/0089349 | A1 | 3/2017 | Bylund et al. | |
| 2018/0135874 | A1 | 5/2018 | Chang | |
| 2018/0187689 | A1 * | 7/2018 | Chen | H05B 45/20 |
| 2018/0223864 | A1 | 8/2018 | Chou | |
| 2018/0249873 | A1 | 9/2018 | Yoshida et al. | |
| 2018/0355875 | A1 | 12/2018 | Freeland et al. | |
| 2019/0335683 | A1 | 11/2019 | Kuckuck et al. | |
| 2019/0351360 | A1 | 11/2019 | Plotkin | |
| 2020/0124051 | A1 | 4/2020 | Chang et al. | |
| 2020/0309152 | A1 | 10/2020 | Sanford | |
| 2021/0006184 | A1 | 1/2021 | Yamamoto et al. | |
| 2021/0219503 | A1 | 7/2021 | Olvera et al. | |
| 2021/0277914 | A1 | 9/2021 | Lu et al. | |
| 2021/0293248 | A1 | 9/2021 | Zhou et al. | |
| 2021/0340991 | A1 | 11/2021 | Ojima et al. | |
| 2021/0345751 | A1 | 11/2021 | Nelson et al. | |
| 2021/0355963 | A1 | 11/2021 | Kang | |
| 2022/0032224 | A1 | 2/2022 | An et al. | |
| 2022/0290680 | A1 | 9/2022 | Metcalf et al. | |
| 2022/0333606 | A1 | 10/2022 | Xie et al. | |
| 2023/0032935 | A1 * | 2/2023 | Bi | F24F 11/33 |
| 2023/0065201 | A1 | 3/2023 | Takeda | |
| 2023/0120339 | A1 | 4/2023 | Kim et al. | |
| 2023/0265854 | A1 | 8/2023 | Chen | |
| 2023/0400039 | A1 | 12/2023 | Schübeler | |
| 2024/0007010 | A1 | 1/2024 | Hongyo et al. | |
| 2024/0042867 | A1 | 2/2024 | Hara et al. | |
| 2024/0206692 | A1 | 6/2024 | Gan | |

FOREIGN PATENT DOCUMENTS

| | | | | |
|---|---|---|---|---|
| CN | 2695693 | Y | 4/2005 | |
| CN | 2844516 | Y | 12/2006 | |
| CN | 202067461 | U | 12/2011 | |
| CN | 102937117 | A | 2/2013 | |
| CN | 202883397 | U | 4/2013 | |
| CN | 103075359 | A | 5/2013 | |
| CN | 103883546 | A | 6/2014 | |
| CN | 103944555 | A | 7/2014 | |
| CN | 104236000 | A | 12/2014 | |
| CN | 204267337 | U | 4/2015 | |
| CN | 104953900 | A | 9/2015 | |
| CN | 105736470 | A | 7/2016 | |
| CN | 205956020 | U | 2/2017 | |
| CN | 206017193 | U | 3/2017 | |
| CN | 106762727 | A | 5/2017 | |
| CN | 107068512 | A | 8/2017 | |
| CN | 206582149 | U | 10/2017 | |
| CN | 107869468 | A | 4/2018 | |
| CN | 207184202 | U | 4/2018 | |
| CN | 108869348 | A | 11/2018 | |
| CN | 105864887 | B | 12/2018 | |
| CN | 109245410 | A | 1/2019 | |
| CN | 208480746 | U | 2/2019 | |
| CN | 109505783 | A | 3/2019 | |
| CN | 109538516 | A | 3/2019 | |
| CN | 109672250 | A | 4/2019 | |
| CN | 208686628 | U | 4/2019 | |
| CN | 209025874 | U | 6/2019 | |
| CN | 209053814 | U | 7/2019 | |
| CN | 110107522 | A * | 8/2019 | F04D 29/541 |
| CN | 209253814 | U | 8/2019 | |
| CN | 110219819 | A | 9/2019 | |
| CN | 110594176 | A | 12/2019 | |
| CN | 110658950 | A | 1/2020 | |
| CN | 210343807 | U | 4/2020 | |
| CN | 111089069 | A | 5/2020 | |
| CN | 111120384 | A | 5/2020 | |
| CN | 111156185 | A | 5/2020 | |
| CN | 210516802 | U | 5/2020 | |
| CN | 210626539 | U | 5/2020 | |
| CN | 111322258 | A | 6/2020 | |
| CN | 111322260 | A | 6/2020 | |
| CN | 111336122 | A | 6/2020 | |
| CN | 111441970 | A | 7/2020 | |
| CN | 211041267 | U | 7/2020 | |
| CN | 211059041 | U | 7/2020 | |
| CN | 211082341 | U | 7/2020 | |
| CN | 111577629 | A | 8/2020 | |
| CN | 211422955 | U | 9/2020 | |
| CN | 211422967 | U | 9/2020 | |
| CN | 112343840 | A | 2/2021 | |
| CN | 212838507 | U | 3/2021 | |
| CN | 212867982 | U | 4/2021 | |
| CN | 212899063 | U | 4/2021 | |
| CN | 212899070 | U | 4/2021 | |
| CN | 212989932 | U | 4/2021 | |
| CN | 213125881 | U | 5/2021 | |
| CN | 213176121 | U | 5/2021 | |
| CN | 213206043 | U | 5/2021 | |
| CN | 213206068 | U | 5/2021 | |
| CN | 213206107 | U | 5/2021 | |
| CN | 213215779 | U | 5/2021 | |
| CN | 112879337 | A | 6/2021 | |
| CN | 112983867 | A | 6/2021 | |
| CN | 113027794 | A | 6/2021 | |
| CN | 213574721 | U | 6/2021 | |
| CN | 213687101 | U | 7/2021 | |
| CN | 213775773 | U | 7/2021 | |
| CN | 113236590 | A | 8/2021 | |
| CN | 213928829 | U | 8/2021 | |
| CN | 213981287 | U | 8/2021 | |
| CN | 213981304 | U | 8/2021 | |
| CN | 214145972 | U | 9/2021 | |
| CN | 214366833 | U | 10/2021 | |
| CN | 214404069 | U | 10/2021 | |
| CN | 214432479 | U | 10/2021 | |
| CN | 214698408 | U | 11/2021 | |

(56) References Cited

FOREIGN PATENT DOCUMENTS

| | | | | | |
|---|---|---|---|---|---|
| CN | 214742197 | U | | 11/2021 | |
| CN | 214742262 | U | | 11/2021 | |
| CN | 215170878 | U | | 12/2021 | |
| CN | 215170978 | U | | 12/2021 | |
| CN | 215256893 | U | | 12/2021 | |
| CN | 215370289 | U | | 12/2021 | |
| CN | 215370290 | U | | 12/2021 | |
| CN | 114034062 | A | | 2/2022 | |
| CN | 114087218 | A | * | 2/2022 | ......... F04D 25/0693 |
| CN | 215719690 | U | | 2/2022 | |
| CN | 215719696 | U | | 2/2022 | |
| CN | 215860873 | U | | 2/2022 | |
| CN | 114382716 | A | | 4/2022 | |
| CN | 114508498 | A | | 5/2022 | |
| CN | 216518757 | U | | 5/2022 | |
| CN | 216742051 | U | | 6/2022 | |
| CN | 216742067 | U | | 6/2022 | |
| CN | 216742071 | U | | 6/2022 | |
| CN | 216742072 | U | | 6/2022 | |
| CN | 216812235 | U | | 6/2022 | |
| CN | 216812236 | U | | 6/2022 | |
| CN | 216842289 | U | | 6/2022 | |
| CN | 217029352 | U | | 7/2022 | |
| CN | 217029355 | U | | 7/2022 | |
| CN | 217107504 | U | | 8/2022 | |
| CN | 217481566 | U | | 9/2022 | |
| CN | 115251549 | A | | 11/2022 | |
| CN | 217898224 | U | | 11/2022 | |
| CN | 217950721 | U | | 12/2022 | |
| CN | 217950722 | U | | 12/2022 | |
| CN | 218439839 | U | | 2/2023 | |
| CN | 218439858 | U | | 2/2023 | |
| CN | 218817072 | U | | 4/2023 | |
| CN | 218817097 | U | | 4/2023 | |
| CN | 218817245 | U | | 4/2023 | |
| CN | 218817263 | U | | 4/2023 | |
| CN | 219012915 | U | | 5/2023 | |
| CN | 116352661 | A | * | 6/2023 | ................ B25F 5/02 |
| CN | 219176615 | U | | 6/2023 | |
| CN | 219672881 | U | | 9/2023 | |
| CN | 220248387 | U | | 12/2023 | |
| CN | 220248398 | U | | 12/2023 | |
| CN | 220452240 | U | | 2/2024 | |
| CN | 220452242 | U | | 2/2024 | |
| CN | 220452243 | U | | 2/2024 | |
| CN | 220452245 | U | | 2/2024 | |
| CN | 220452247 | U | | 2/2024 | |
| CN | 220539912 | U | | 2/2024 | |
| CN | 220544885 | U | | 2/2024 | |
| CN | 111322260 | B | | 6/2024 | |
| DE | 20320023 | U1 | | 4/2004 | |
| EP | 3282057 | B1 | | 3/2020 | |
| GB | 761583 | A | | 11/1956 | |
| JP | 1974019957 | U | | 2/1974 | |
| JP | 1987007997 | A | | 1/1987 | |
| JP | 1988235694 | A | | 9/1988 | |
| JP | 1988191289 | U | | 12/1988 | |
| JP | 2007221470 | A | | 8/2007 | |
| JP | 2008215335 | A | | 9/2008 | |
| JP | 2009191627 | A | | 8/2009 | |
| JP | 2013051757 | A | | 3/2013 | |
| JP | 2014123950 | A | | 7/2014 | |
| JP | 2014535133 | A | | 12/2014 | |
| JP | 5747632 | B2 | | 7/2015 | |
| JP | 2016133001 | A | | 7/2016 | |
| JP | 2018010836 | A | | 1/2018 | |
| JP | 6314098 | B2 | | 4/2018 | |
| JP | 2019046945 | A | | 3/2019 | |
| JP | 3225662 | U | | 3/2020 | |
| JP | 3226224 | U | | 5/2020 | |
| JP | 3230942 | U | | 3/2021 | |
| JP | 3231822 | U | | 4/2021 | |
| JP | 2021069157 | A | | 4/2021 | |
| JP | 2021152340 | A | | 9/2021 | |
| JP | 6950932 | B2 | | 10/2021 | |
| JP | 2021179209 | A | | 11/2021 | |
| JP | 2022020093 | A | | 2/2022 | |
| JP | 2022025054 | A | | 2/2022 | |
| JP | 2022515310 | A | | 2/2022 | |
| KR | 101070662 | B1 | | 10/2011 | |
| KR | 20180061094 | A | | 6/2018 | |
| KR | 20200104187 | A | | 9/2020 | |
| KR | 20200116322 | A | | 10/2020 | |
| KR | 20210115564 | A | | 9/2021 | |
| KR | 20210117107 | A | | 9/2021 | |
| KR | 102323350 | B1 | | 11/2021 | |
| KR | 102408069 | B1 | | 6/2022 | |
| TW | 1278576 | B | | 4/2007 | |
| WO | 2005068846 | A1 | | 7/2005 | |
| WO | 2017079993 | A1 | | 5/2017 | |
| WO | 2018176295 | A1 | | 10/2018 | |
| WO | 2021073509 | A1 | | 4/2021 | |
| WO | 2021095860 | A1 | | 5/2021 | |
| WO | 2023046145 | A1 | | 3/2023 | |
| WO | 2023217299 | A1 | | 4/2023 | |
| WO | 2024099468 | A1 | | 5/2024 | |
| WO | 2024131739 | A2 | | 6/2024 | |

OTHER PUBLICATIONS

International Search Report and Written Opinion, International Application No. PCT/CN2024/107360, International mailed Nov. 8, 2024 (19 pages).
International Search Report and Written Opinion, International Application No. PCT/CN2023/125354, International mailed Nov. 24, 2023 (12 pages).
Australian First Examination Report, Application No. 2024287283, Australian mailed Feb. 28, 2025 (7 pages).
Notice on Third Party Submission of IDS, U.S. Appl. No. 18/616,410, US mailed Jan. 15, 2025 (196 pages).
Japanese Decision of Refusal, Japanese Patent Application No. 2024-519102, mailed Mar. 11, 2025 (10 pages).
Australian Second Examination Report, Application No. 2023411862, Australian mailed Mar. 19, 2025 (6 pages).
Australian Second Examination Report, Application No. 2023378550, Australian mailed Mar. 21, 2025 (4 pages).
US Non Final OA, U.S. Appl. No. 18/922,280, mailed Mar. 28, 2025 (87 pages).
European Examination Report, European Application No. 22872189.0, mailed Apr. 16, 2025 (6 pages).
International Search Report and Written Opinion, International Application No. PCT/CN2023/099539, International mailed Sep. 11, 2023 (16 pages).
International Search Report and Written Opinion, International Application No. PCT/CN2023/139669, International mailed Apr. 17, 2024 (20 pages).
International Search Report and Written Opinion, International Application No. PCT/CN2023/139668, International mailed Apr. 11, 2024 (18 pages).
International Search Report and Written Opinion, International Application No. PCT/CN2022/121246, mailed Dec. 29, 2022 (18 pages).
Canada First Office Action, Canada Application No. 3,233,163, mailed Apr. 19, 2024(7 pages).
Australian Examination Report No. 1, Application No. 2022349651,mailed Apr. 30, 2024(4 pages).
Australian Notice of Acceptance for Patent Application, Australian Application No. 2022349651, mailed Aug. 30, 2024 (4 pages).
US Non Final OA, U.S. Appl. No. 18/616,410, US mailed Aug. 15, 2024(132 pages).
Japanese First Notice of Reasons for Refusal,Japanese Patent Application No. 2024-519102 ,mailed Oct. 22, 2024 (14 pages).
European Search Report,European Application No. 22872189.0, mailed Dec. 5, 2024 (103 pages).
Australian Examination Report No. 1, Application No. 2023411862, Australian mailed Dec. 19, 2024 (5 pages).
Malaysia Adverse report on substantive examination, Malaysia Patent Application No. PI2024006369, mailed Jan. 2, 2025(5 pages).

(56) References Cited

OTHER PUBLICATIONS

Australian Examination Report No. 1, Australian Application No. 2023378550, Australian mailed Jan. 7, 2025 (6 pages).
US Final OA, U.S. Appl. No. 18/616,410, US mailed Jan. 13, 2025 (84 pages).
Japanese First Notice of Reasons for Refusal, Japanese Patent Application No. 2024-206845, mailed May 27, 2025 (10 pages).
Japanese First Notice of Reasons for Refusal, Japanese Patent Application No. 2024-566694, mailed May 27, 2025 (11 pages).
US Non Final OA, U.S. Appl. No. 18/792,626, mailed May 30, 2025 (100 pages).
Japanese First Notice of Reasons for Refusal, Japanese Patent Application No. 2024-563563, mailed Jun. 3, 2025 (52 pages).
US Non Final OA, U.S. Appl. No. 18/927,186, mailed Jun. 11, 2025 (15 pages).
Malaysia Second Substantive Examination, Malaysia Application No. PI2025000692, mailed Jun. 23, 2025 (4 pages).
Malaysia Second Substantive Examination, Malaysia Application No. PI2025000690, mailed Jun. 26, 2025 (5 pages).
Canada First Office Action, Canada Application No. 3,256,202, mailed Jul. 7, 2025 (3 pages).
Japanese First Notice of Reasons for Refusal, Japanese Patent Application No. 2024-577365, mailed Jul. 22, 2025 (47 pages).
US Final OA, U.S. Appl. No. 18/922,280, mailed Jul. 3, 2025 (70 pages).
Malaysia First Substantive Examination, Malaysia Application No. PI2024006199, mailed Jul. 30, 2025 (7 pages).
Malaysia First Substantive Examination, Malaysia Application No. PI2024006571, mailed Jul. 31, 2025 (6 pages).
US Third Party Submission of IDS for U.S. Appl. No. 18/927,186, mailed Jul. 31, 2025 (157 pages).
Korea Third Party Submission the Reference for 10-2024-7043005, mailed Jul. 2, 2025 (5 pages).
Japanese First Notice of Reasons for Refusal,Japanese Patent Application No. 2025-090653, mailed Aug. 5, 2025 (12 pages).
US Third Party Submission of IDS for U.S. Appl. No. 19/095,179, mailed Aug. 22, 2025 (58 pages).
US Third Party Submission of IDS for U.S. Appl. No. 18/792,626, mailed Jul. 31, 2025 (95 pages).
Japanese First Notice of Reasons for Refusal,Japanese Patent Application No. 2025-505446, mailed Jul. 19, 2025 (10 pages).
Korea Third Party Submission the Reference for 10-2024-7011777, mailed Jul. 2, 2025 (5 pages).
Malaysia Third Substantive Examination, Malaysia Application No. PI2025000692, mailed Sep. 3, 2025 (4 pages).
European partial Search Report, European Application No. 23905902.5, mailed Sep. 12, 2025 (58 pages).
US Non Final OA, U.S. Appl. No. 19/095,179, mailed Sep. 15, 2025 (98 pages).
Malaysia Second Substantive Examination, Malaysia Application No. PI2024006199, mailed Sep. 12, 2025 (7 pages).
US Final OA, U.S. Appl. No. 18/792,626, mailed Aug. 29, 2025 (65 pages).
US Non Final OA2, U.S. Appl. No. 18/922,280, mailed Oct. 7, 2025 (81 pages).
European Search Report, European Application No. 24836654.4, mailed Oct. 14, 2025 (8 pages).
European Search Report, European Application No. 23888153.6, mailed Oct. 15, 2025 (8 pages).
Canada First Office Action, Canada Application No. 3,251,815, mailed Oct. 7, 2025 (4 pages).
Canada First Office Action, Canada Application No. 3,251,828, mailed Oct. 21, 2025 (5 pages).
Malaysia First Substantive Examination, Malaysia Application No. PI2025005073, mailed Oct. 31, 2025 (6 pages).
Japanese Second Notice of Reasons for Refusal, Japanese Patent Application No. 2024-206845, mailed Nov. 11, 2025 (10 pages).
Japanese Second Notice of Reasons for Refusal,Japanese Patent Application No. 2024-566694, mailed Nov. 11, 2025 (12 pages).
European Invention Search Report, European Application No. 23803067.0, mailed Nov. 17, 2025 (11 pages).
US Final OA, U.S. Appl. No. 18/616,410, mailed Nov. 26, 2025 (84 pages).
European Invention Search Report, European Application No. 23905902.5, mailed Dec. 3, 2025 (15 pages).
Japanese Second Notice of Reasons for Refusal, Japanese Patent Application No. 2024-563563, mailed Dec. 2, 2025 (18 pages).
US Final OA, U.S. Appl. No. 19/095,179, mailed Dec. 17, 2025 (72 pages).
Japanese Decision of Rejection, Japanese Patent Application No. 2025-505446, mailed Dec. 23, 2025 (8 pages).
Japanese First Notice of Reasons for Refusal,Japanese Patent Application No. 2025-536080, mailed Oct. 28, 2025 (14 pages).
Malaysia First Substantive Examination, Malaysia Application No. PI2025003740, mailed Nov. 14, 2025 (6 pages).
Korean First Request for the Submission of an Opinion , Korean Application No. 10-2024-7011777, mailed Sep. 22, 2025 (36 pages).
Australian First Examination Report , Australian Application No. 2023412371, mailed Jun. 30, 2025 (6 pages).
Australian Second Examination Report , Australian Application No. 2023412371, mailed Oct. 14, 2025 (7 pages).
Singapore Search Report Written Opinion, Singapore Application No. 11202504229P, mailed Oct. 16, 2025 (11 pages).
Malaysia Second Substantive Examination, Malaysia Application No. PI2025005073, mailed Dec. 27, 2025 (4 pages).
Japanese second Notice of Reasons for Refusal, Japanese Patent Application No. 2024-577365, mailed Jan. 6, 2026 (26 pages).
Malaysia First Substantive Examination, Malaysia Application No. PI2025007198, mailed Dec. 31, 2025 (7 pages).
US Non Final OA, U.S. Appl. No. 18/792,626, mailed Jan. 8, 2026 (81 pages).
Australian First Examination Report , Australian Application No. 2024278338, mailed Jan. 12, 2026 (3 pages).
Malaysia Second Substantive Examination, Malaysia Application No. PI2025003740, mailed Dec. 29, 2025 (6 pages).
Philippines First Substantive Examination, Philippines Application No. 1/2024/552767, mailed Jan. 2, 2026(7 pages).
Japanese Third Notice of Reasons for Refusal, Japanese Patent Application No. 2024-577365, mailed Jun. 30, 2026 (9 pages).
US Non Final office action, U.S. Appl. No. 19/095,179, mailed Apr. 16, 2026 (69 pages).
Singapore Invitation to Respond to Written Opinion, Singapore Application No. 10202403720U, mailed Apr. 23, 2026 (19 pages).
Singapore Invitation to Respond to Written Opinion, Singapore Application No. 11202500587U, mailed Apr. 30, 2026 (15 pages).
Singapore Invitation to Respond to Written Opinion, Singapore Application No. 11202407808R, mailed May 9, 2026 (11 pages).
Korean First Request for the Submission of an Opinion , Korean Application No. 10-2024-7035479, mailed May 21, 2026 (10 pages).
Korean First Request for the Submission of an Opinion , Korean Application No. 10-2024-7043005, mailed May 21, 2026 (? pages).
Korean First Request for the Submission of an Opinion , Korean Application No. 10-2025-7001101, mailed May 21, 2026 (9 pages).
Korean First Request for the Submission of an Opinion , Korean Application No. 10-2025-7001029, mailed May 21, 2026 (8 pages).
US Non Final office action, U.S. Appl. No. 19/458,315, mailed May 20, 2026 (128 pages).
US Non Final office action, U.S. Appl. No. 19/458,087, mailed May 20, 2026 (128 pages).
Malaysia Second Substantive Examination, Malaysia Application No. PI2024006571, mailed May 25, 2026 (4 pages).
US Final office action, U.S. Appl. No. 18/792,626, mailed Jun. 3, 2026 (108 pages).
Philippines First Substantive Examination Report, Philippines Application No. Invention 1/2024/552638, mailed Jun. 3, 2026 (4 pages).
Singapore First Invitation to Respond to Written Opinion, Singapore Application No. 11202501530V, mailed Jan. 16, 2026 (9 pages).
US Final office action, U.S. Appl. No. 18/922,280, mailed Jan. 30, 2026 (70 pages).
European Search Report,European Application No. 25226701.8, mailed Feb. 6, 2026 (36 pages).

(56) References Cited

OTHER PUBLICATIONS

European Search Report,European Application No. 25220040.7, mailed Feb. 6, 2026 (29 pages).
European Search Report,European Application No. 25226757.0, mailed Feb. 6, 2026 (30 pages).
European Search Report,European Application No. 25218680.4, mailed Feb. 6, 2026 (105 pages).
European Search Report,European Application No. 25226726.5, mailed Feb. 6, 2026 (35 pages).
Canada First Office Action, Canada Application No. 3,262,776, mailed Feb. 2, 2026 (6 pages).
Malaysia Second Substantive Examination, Malaysia Application No. PI2025007198, mailed Mar. 6, 2026 (4 pages).
Canada Second Office Action,Canada Application No. 3,251,815, mailed Mar. 26, 2026 (4 pages).
Philippines Second Substantive Examination Report, Philippines Application No. Invention 1/2024/552767, mailed Mar. 27, 2026 (4 pages).
Japanese Decision of Refusal, Japanese Patent Application No. 2024-206845, mailed Apr. 7, 2026 (6 pages).
Japanese Decision of Refusal, Japanese Patent Application No. 2024-566694, mailed Apr. 7, 2026 (6 pages).
US Notice of Allowance and fees due (PTOL-85), U.S. Appl. No. 18/616,410, mailed Apr. 10, 2026 (82 pages).

* cited by examiner the operating voltage of the high-speed three-phase motor is controlled to be in a range of 2 to 18 V, the operating current of the high-speed three-phase motor is controlled to be in a range of 0.1 to 10 A, and/or the rated operating power of the high-speed three-phase motor is controlled to be in a range of 0.5 to 100 W — S101 the drive module controls, based on the operating voltage, the operating current, and/or the rated operating power, the rated operating speed of the high-speed three-phase motor to reduce noise generated due to a high rotation speed and to control the air speed to be in a predetermined air speed range — S102

FIG. 26

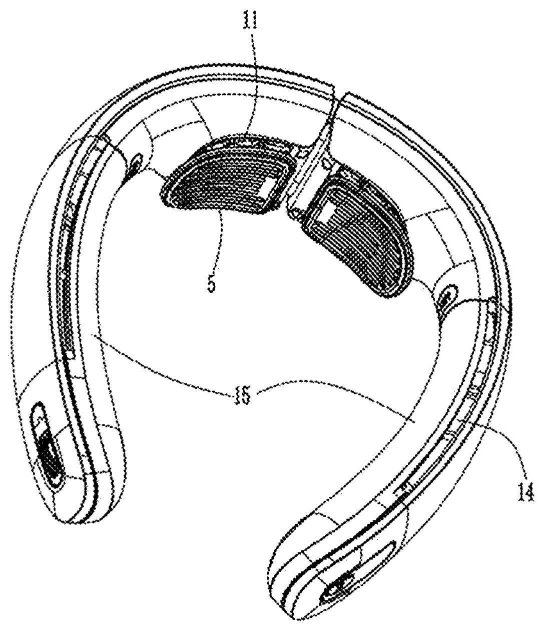

FIG. 27

MOTOR DRIVE CONTROL CIRCUIT, PORTABLE FAN CONFIGURED WITH HIGH-SPEED THREE-PHASE MOTOR, AND CONTROL METHOD OF PORTABLE FAN

CROSS REFERENCE TO RELATED APPLICATIONS

The present application is a continuation application of the international patent application No. PCT/CN2024/107360, filed on Jul. 24, 2024, which claims the priority of the Chinese patent application No. 202321965090.9, filed on Jul. 24, 2023. Contents of which are incorporated herein by its entireties.

TECHNICAL FIELD

Embodiments of the present disclosure relate to the technical field of electronics and circuits, and more specifically, to a motor drive control circuit, a portable fan configured with a high-speed three-phase motor, and a control method of the portable fan.

BACKGROUND

Currently, application scenarios of a high-speed three-phase motor mainly include industrial devices, power tools, aerospaces and automobiles. For example, a machine tool in an industrial device may be arranged with the high-speed three-phase motor, which can rotate at a high speed, to improve productivity and machining accuracy. A vehicle may be arranged with the high-speed three-phase motor, which can rotate at a high speed, to improve a power output and a fuel efficiency. Generally, the high-speed three-phase motor may operate at a speed of tens of thousands to more than 100,000 revolutions per minute (rpm). Since these devices require strong power, the high-speed three-phase motor is typically powered by utility power in a range of 110V to 240V to ensure that the motor can stably provide an output at a high rotation speed. A manufacturing cost of the high-speed motor is relatively high, which may be from tens to hundreds of dollars. This is because the high-speed three-phase motor needs to be made from materials having higher strength and made from more precise manufacturing processes, ensuring the high-speed three-phase motor to be stable and durable when rotating at the high speed. Therefore, as being understood by any ordinary skilled person in the art, the high-speed three-phase motor may not be applied to a small-sized portable fan, which is sold at a price of only a few tens of dollars. Due to manufacturing costs, the small-sized portable fan is usually configured with a low-cost direct current (DC) motor (such as a brushless DC motor or a brushed DC motor). The DC motor has a low manufacturing cost and operates at a lower rotation speed and is more suitable for a low-priced market. Taking the brand Dyson as an example, a high-end vacuum cleaner and a hair dryer of the Dyson is configured with a high-speed single-phase motor, instead of the three-phase motor. Product configurations of the Dyson are determined by taking into account market positions, cost control, user demands, and so on. Compared with the three-phase motor, the single-phase motor is structurally simpler, can be easily controlled, and has a reduced manufacturing cost, and therefore, a product configured with the single-phase motor can meet demands of household appliances.

In summary, in the art, no small-sized portable fan is configured with the high-speed three-phase motor. This is because the high manufacturing cost and high power consumption of the high-speed motor do not match with requirements of the small-sized portable fan for having a low manufacturing cost and having low power consumption.

The portable fan, during being small and light in weight, can be easily carried and has gradually become a necessary small-sized electrical device during daily life. The portable fan cools a user and brings comfort for the user in summer. The portable fan has become an ideal choice for many people during traveling and living at home. However, the portable fan in the art is configured with a motor having a lower rotation speed, limited air speed and air volume can be provided, and high vibration and noise are generated, resulting in the user being unable to obtain ideal comfort experience under various environments and demands.

A motor drive circuit in the art provides a slow response and has a complex control logic. A current of a motor stator winding can be adjusted within a small range. Therefore, a cooling effect of the portable fan in various high-temperature scenarios is affected.

SUMMARY

The present disclosure provides a portable fan configured with a high-speed three-phase motor and a control method of the portable fan, so as to solve the above technical problems.

In a first aspect, a portable fan configured with a high-speed three-phase motor is provided and includes a control module, a drive module, and the high-speed three-phase motor. The high-speed three-phase motor has an operating voltage of 2V to 18 V and an operating current of 0.1 to 10 A, and/or has a rated operating power of 0.5 to 100 W.

The control module is configured to control, via the drive module and based on the operating voltage, the operating current, and/or the rated operating power, a rated operating rotation speed of the high-speed three-phase motor to reduce noise generated due to a high rotation speed of the high-speed three-phase motor and to control an air speed to be within a preset air speed range.

In a second aspect, a control method of the portable fan in the first aspect is provided, the portable fan comprises at least: a handheld fan to be used by being held in a hand, a desktop fan that is portable and is used by standing on a desktop, or a neck fan worn to a neck of a user, and the method includes:

- controlling the operating voltage of the high-speed three-phase motor to be in a range of 2 to 18 V, controlling the operating current of the high-speed three-phase motor to be in a range of 0.1 to 10 A, and/or controlling the rated operating power of the high-speed three-phase motor to be in a range of 0.5 to 100 W;
- controlling, by the drive module based on the operating voltage, the operating current, and/or the rated operating power, the rated operating rotation speed of the high-speed three-phase motor to reduce noise generated due to the high rotation speed and to control the air speed to be in the predetermined air speed range.

In a third aspect, a motor drive control circuit of a portable fan includes a battery power supply, a voltage regulator unit, a master control unit, a motor, a USB access circuit, an analog-to-digital converter power supply circuit, and a display unit. The motor drive control circuit of the portable fan comprises at least one of: a motor drive control unit, a motor drive circuit, and a rotor position detection circuit. The portable fan comprises at least: a handheld fan to be used by being held in a hand, a desktop fan that is portable and is used by standing on a desktop, or a neck fan worn to a neck of a user; and the portable fan is arranged with a battery to supply power to the high-speed three-phase motor when the portable fan is being carried by a user.

BRIEF DESCRIPTION OF THE DRAWINGS

In order to more clearly illustrate technical solutions in embodiments of the present disclosure, accompanying drawings used in the embodiments will be briefly introduced below. Obviously, the accompanying drawings in the following description show only some of the embodiments of the present disclosure, and any ordinary skilled person in the art may obtain other accompanying drawings based on these drawings without creative work.

FIG. 26 is a flow chart of a control method of a portable fan according to another embodiment of the present disclosure.

FIG. 27 is a structural schematic view of the portable fan configured with the high-speed three-phase motor according to another embodiment of the present disclosure.

DETAILED DESCRIPTIONS

In order to thoroughly understand the present disclosure, detailed structures and operations will be illustrated in the following in order to elucidate technical solutions proposed by the present disclosure. Preferred embodiments of the present disclosure are described in detail below, however, in addition to these detailed descriptions, the present disclosure may have other embodiments.

Embodiment 1

The present embodiment provides a portable fan to solve a technical problem that a user is unable to adjust an air speed arbitrarily according to demands, due to a mechanical switch being arranged, resulting in a poor user experience.

Figure 1:
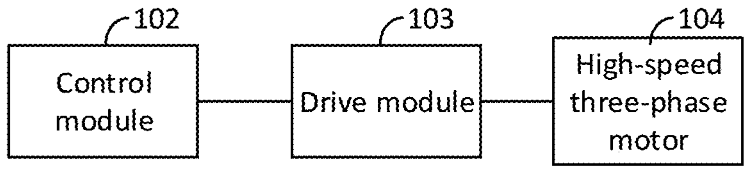
FIG. 1 is a structural schematic view of a portable fan configured with a high-speed three-phase motor according to an embodiment of the present disclosure.

The present embodiment provides a portable fan configured with a high-speed three-phase motor, as shown in FIG. 1, including a control module 102, a drive module 103, and a high-speed three-phase motor 104. The high-speed three-phase motor 104 has an operating voltage of 2 to 18 V and an operating current of 0.1 to 10 A, and/or has a rated operating power of 0.5 to 100 W. The control module 102 controls, based on the operating voltage, the operating current, and/or the rated operating power, a rated operating rotation speed of the high-speed three-phase motor 104 via the drive module 103 to reduce noise, due to a high rotation speed, of the high-speed three-phase motor 104 and to control an air speed to be in a preset air speed range.

In the present embodiment, the control module 102 and the driving module 103 operate cooperatively to enable the high-speed three-phase motor to be driven at a low voltage to meet specific demands of the portable fan. The number of slots and the number of pole pairs need to be adjusted to enable the motor to operate at the low voltage. A high-performance iron-core material is used to reduce a magnetic loss and to improve an operation efficiency at the low voltage. A high-efficiency inverter is arranged to convert a low-voltage direct current into a three-phase alternating current. In this way, stability of a power supply is ensured, performance of the motor is prevented from being affected by voltage fluctuations.

The operating voltage is in a range of 2 to 18 V, the operating current is in a range of 0.1 to 10 A, the rated operating power is in a range of 0.5 to 100 W. In this way, the high-speed three-phase motor 104 can provide, at the low voltage, a more efficient rotation speed and a more efficient power output compared to the motor arranged in the portable fan currently in the art, and demands of portable devices can be met. The control module 102 accurately controls the high-speed three-phase motor 104 based on the operating voltage, the operating current, and the rated operating power, which are monitored in real time. The control module 102 adjusts power supply parameters for the high-speed three-phase motor 104 to effectively reduce noise generated when the motor operates at the high rotation speed. The control module 102 can also adjust the air speed of the portable fan to enable the air speed to be within the preset air speed range. Compared to a single-phase low-speed motor, the high-speed three-phase motor 104 in the present disclosure ensures comfort of usage and stability of the portable fan. The drive module 103 is connected to the control module 102 and the high-speed three-phase motor 104 and converts commands of the control module 102 into actual motor drive signals. A highly-efficient inverter technology is applied for the drive module 103 to convert the low-voltage direct current into the alternating current suitable for the high-speed three-phase motor 104, ensuring the motor to operate efficiently. Under various operating conditions, the drive module 103 adjusts the rotation speed and an output power of the motor based on the commands of the control module 102.

According to the present embodiment, the control module, the drive module, and the high-speed three-phase motor are combined with each other, providing the portable fan which operates highly efficiently, generates low noise, and has adjustable air speeds. Due to low-voltage driving and the precise control, the fan is highly portable and can be used comfortably, overall performance and an energy efficiency of the fan are also improved. The present embodiment can be applied to the portable fan, which needs high performance and needs to generate low noise. A gap in the market for high-speed three-phase motors being used in small-sized portable devices can be filled.

Specific applications of the present embodiment include, but not limited to, following implementations.

In an embodiment, when the high-speed three-phase motor 104 has the operating voltage of 6 to 8.4 V, the operating current of 0.12 to 1 A, and/or the rated operating power of 0.8 to 9 W, the control module 102 controls, based on the operating voltage, the operating current, and/or the rated operating power and through the drive module 103, the high-speed three-phase motor 104 to have a rated operating speed of 6000 to 15000 RPM/MIN.

The high-speed three-phase motor 104 is driven by a voltage in a range of 6 to 8.4V, such that the high-speed three-phase motor 104 can be powered by two batteries connected in series. The high-speed three-phase motor 104 may operate at the operating current in a range of 0.12 to 1 A, ensuring the high-speed three-phase motor 104 to stably operate at various rotation speeds. The operating power of the high-speed three-phase motor 104 is in a range of 0.8 W-9 W to satisfy a power demand of the portable fan. The control module 102 monitors the operating voltage, the current and the power of the motor in real time and performs adjustment according to these parameters. The control module 102 can accurately control the rotation speed of the motor within the range of 6,000-15,000 RPM. The drive module 103 converts the direct current of 6 to 8.4V into the three-phase alternating current. The inverter drives the high-speed three-phase motor 104. The two-batteries are connected in series to provide a stable voltage. The fan has 4 pole pairs, 12 slots, 5 blades, and 6 guide blades/impellers.

In an embodiment, when the operating voltage of the high-speed three-phase motor 104 is in a range of 5.9 to 8.4 volts, the operating current of the high-speed three-phase motor 104 is in a range 0.5 to 6 A, and/or the rated operating power of the high-speed three-phase motor 104 is in a range 5 to 50 W, the control module 102 controls, based on the operating voltage, the operating current, and/or the rated operating power and through the drive module 103, the rated operating rotation speed of the high-speed three-phase motor 104 to be in a range of 20,000 to 80,000 RPM/MIN.

The high-speed three-phase motor 104 is driven by a voltage in a range of 5.9 to 8.4V, which may be 5.9V, 6.0V, 6.5V, 7.2V, . . . , 8.4V. Two batteries connected in series may be arranged to supply power to the high-speed three-phase motor 104. The operating current of the high-speed three-phase motor 104 is in a range of 0.5 to 6 A, the high-speed three-phase motor 104 is ensured to stably operate at various rotation speeds. The operating power of the high-speed three-phase motor 104 is in a range of 5 W-50 W, power requirements of portable fan can be met. The control module 102 monitors the operating voltage, the current and the power of the motor in real time and performs adjustment according to these parameters. The control module 102 can accurately control the rotation speed of the motor within the range of 20000 to 80000 RPM. The drive module 103 converts the direct current of 5.9-8.4V into the three-phase alternating current. The inverter drives the high-speed three-phase motor 104. The two-batteries are connected in series to provide a stable voltage. The fan has 1 pole pair, 6 slots, 13 blades, and 6 guide blades/impellers.

In an embodiment, when the operating voltage of the high-speed three-phase motor 104 is in a range of 2 to 5.8 volts, the operating current of the high-speed three-phase motor 104 is in a range 0.25 to 2 A, and/or the rated operating power of the high-speed three-phase motor 104 is in a range 1 to 8 W, the control module 102 controls, based on the operating voltage, the operating current, and/or the rated operating power and through the drive module 103, the rated operating rotation speed of the high-speed three-phase motor 104 to be in a range of 15000 to 41000 RPM/MIN.

The high-speed three-phase motor 104 is driven by a voltage in a range of 2 to 5.8V, which may be 2V, 2.1V, 2.5V, 3.7V, . . . , 4.3V, and 5.8V. Two batteries connected in series may be arranged to supply power to the high-speed three-phase motor 104. The operating current of the high-speed three-phase motor 104 is in a range of 0.25 to 1.8 A, the high-speed three-phase motor 104 is ensured to stably operate at various rotation speeds. The operating power of the high-speed three-phase motor 104 is in a range of 1 W to 8 W, power requirements of portable fan can be met. The control module 102 monitors the operating voltage, the current and the power of the motor in real time and performs adjustment according to these parameters. The control module 102 can accurately control the rotation speed of the motor within the range of 15000 to 41000 RPM. The drive module 103 converts the direct current of 2 to 5.8V into the three-phase alternating current. The inverter drives the high-speed three-phase motor 104. The two-batteries are connected in series to provide a stable voltage. The fan has 4 pole pairs, 9 slots, 9 blades, and 7 guide blades/impellers.

In an embodiment, when the operating voltage of the high-speed three-phase motor 104 is in a range of 8.5 to 12.6 V, the operating current of the high-speed three-phase motor 104 is in a range 0.5 to 5 A, and/or the rated operating power of the high-speed three-phase motor 104 is in a range 6 to 60 W, the control module 102 controls, based on the operating voltage, the operating current, and/or the rated operating power and through the drive module 103, the rated operating rotation speed of the high-speed three-phase motor 104 to be in a range of 25000 to 85000 RPM/MIN.

The high-speed three-phase motor 104 is driven by a voltage in a range of 8.5 to 12.6V, which may be 8.5V, 9.0V, 10.5V, 12.0V, . . . , and 12.6V. Three batteries connected in series may be arranged to supply power to the high-speed three-phase motor 104. The operating current of the high-speed three-phase motor 104 is in a range of 0.5 to 5 A, the high-speed three-phase motor 104 is ensured to stably operate at various rotation speeds. The operating power of the high-speed three-phase motor 104 is in a range of 6 W to 60 W, power requirements of portable fan can be met. The control module 102 monitors the operating voltage, the current and the power of the motor in real time and performs adjustment according to these parameters. The control module 102 can accurately control the rotation speed of the motor within the range of 25000 to 85000 RPM. The drive module 103 converts the direct current of 8.5 to 12.6V into the three-phase alternating current. The inverter drives the high-speed three-phase motor 104. The three batteries are connected in series to provide a stable voltage. The fan has 1 pole pair, 6 slots, 13 blades, and 6 guide blades/impellers.

In an embodiment, when the operating voltage of the high-speed three-phase motor 104 is in a range of 12 to 18 V, the operating current of the high-speed three-phase motor 104 is in a range 0.1 to 1 A, and/or the rated operating power of the high-speed three-phase motor 104 is in a range 2 to 16 W, the control module 102 controls, based on the operating voltage, the operating current, and/or the rated operating power and through the drive module 103, the rated operating rotation speed of the high-speed three-phase motor 104 to be in a range of 2000 to 6000 RPM/MIN.

The high-speed three-phase motor 104 is driven by a voltage in a range of 12 to 18V, which may be 12V, 12.5V, 14V, 16.8V, . . . , and 18V. Four batteries connected in series may be arranged to supply power to the high-speed three-phase motor 104. The operating current of the high-speed three-phase motor 104 is in a range of 0.1 to 1 A, the high-speed three-phase motor 104 is ensured to stably operate at various rotation speeds. The operating power of the high-speed three-phase motor 104 is in a range of 2 W to 16 W, power requirements of portable fan can be met. The control module 102 monitors the operating voltage, the current and the power of the motor in real time and performs adjustment according to these parameters. The control module 102 can accurately control the rotation speed of the motor within the range of 2000 to 6000 RPM. The drive module 103 converts the direct current of 12 to 16.8V into the three-phase alternating current. The inverter drives the high-speed three-phase motor 104. The four batteries are connected in series to provide a stable voltage. The fan has 4 pole pairs, 6 slots, 9 blades, and 10 guide blades/impellers.

In an embodiment, when the operating voltage of the high-speed three-phase motor 104 is 3.7V or 4.3V, the operating current of the high-speed three-phase motor 104 is in a range of 0.25 to 2 A, and/or the rated operating power of the high-speed three-phase motor 104 is in a range of 1 to 8 W, the control module 102 controls, based on the operating voltage, the operating current, and/or the rated operating power and through the drive module 103, the rated operating rotation speed of the high-speed three-phase motor 104 to be in a range of 15000 to 41000 RPM/MIN.

Figure 2:
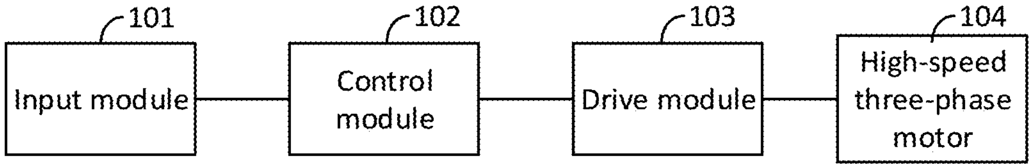
FIG. 2 is another structural schematic view of the portable fan configured with the high-speed three-phase motor according to an embodiment of the present disclosure.

In an embodiment, the present embodiment provides a portable fan, as shown in FIG. 2, including: an input module 101, the control module 102, the drive module 103, and the high-speed three-phase motor 104, which are connected to each other in sequence. The drive module 103 includes a first bridge arm, a second bridge arm, and a third bridge arm. Each bridge arm includes: an upper bridge arm transistor switch located at a side of a center point of the bridge arm; and a lower bridge arm transistor switch located at the other side of the center point of the bridge arm. The center point of each bridge arm is connected to a one-phase coil of the high-speed three-phase motor 104. The input module 101 outputs an air speed adjustment control signal according to a user instruction. The control module 102 generates a PWM control signal according to the air speed adjustment control signal and controls, based on the PWM control signal, each transistor switch of each bridge arm to adjust the rotation speed of the high-speed three-phase motor 104.

The input module 101 further outputs a switch signal according to the user instruction. The control module 102 generates a switch control signal according to the switch signal and controls, through the switch control signal, each transistor switch of each bridge arm to drive the high-speed three-phase motor 104 to start operating or stop operating.

When the user instruction is to turn on the fan, the input module 101 outputs the switch signal according to the user instruction. When the user instruction is to adjust the air speed, the input module 101 outputs the air speed adjustment control signal according to the user instruction. The user may input the control instruction in various ways according to a type of the input module 101. For example, an instruction may be input into the input module 101 by a touch, voice, or other input manners. When the input module 101 is a touch control module 111, the input module 101 generates the switch signal when detecting a touch action. The input module 101 generates the air speed adjustment signal when detecting a sliding action. When the input module 101 is a voice module 112, the input module 101 captures a voice signal of the user and converts the voice signal into the switch signal and the air speed adjustment control signal. When the input module 101 is a networking module 106, the input module 101 receives a remote control signal or an air speed adjustment parameter set by the user. The input module 101 may alternatively be a multifunctional input module. Various functions, such as timing control, lighting control, swinging control, spraying control, cooling control, and so on, can be achieved through the input module 101. The timing control refers to the user setting a turn-on time point and a turn-off time point through the touch control module 111; or the user setting a timing function remotely through the voice module 112 and the networking module 106. The lighting control refers to: the user adjusting a light to be switched on/off, adjusting brightness of the light, and adjusting a color of the light through the touch module 111; or the user controlling the light remotely through the voice module 112 and the networking module 106. The swinging control refers to: the user setting a swinging angle and a swinging speed of the fan through the touch control module 111; or the user remotely controlling the swinging function through the voice module 112 and the networking module 106. The spraying control refers to: the user turning on a spraying function or adjusting the amount of spraying through the touch control module 111; or controlling the spraying function remotely through the voice module 112 and the networking module 106. The cooling control refers to: the user adjusting a cooling intensity of the fan through the touch module 111, or remotely controlling the cooling function through the voice module 112 and the networking module 106. Multiple functional control can be realized through the input module, allowing the user to use and adjust the fan more flexibly to meet demands of various usage scenarios.

The input module 101 and the control module 102 are connected to each other by wired or wireless manners, and the input module is provided on a shell of the portable fan or on another electronic device.

The input module 101 and the control module 102 are connected to each other by wires, such as by an I2C connection line, an SPI connection line, a UART connection line, a GPIO interface, a USB interface, a CAN bus, an I2S interface, an ADC interface, and so on. The I2C connection line (inter-integrated circuit) is a serial communication protocol and is commonly used to connect a low-speed peripheral device (such as a touch module) to a motherboard, and two wires (SDA and SCL) are used for data transfer and clock synchronization. The SPI connection line (serial peripheral interface) is a high-speed synchronous serial communication protocol, where four wires (MISO, MOSI, SCK, and SS) are used for data transmission. The UART connection line (universal asynchronous receiver-transmitter) is an asynchronous serial communication protocol, where two lines (Tx and Rx) are used for data transmission. The GPIO interface (general-purpose input/output) is a general-purpose input/output interface for digital signals and is configured in either an input mode or an output mode. The USB interface (universal serial bus) is a general-purpose and high-speed serial communication interface, supporting plug-and-use and hot-plugging. The CAN bus (controller area network) is a serial communication protocol for industrial automation, being highly reliable and having real-time performance. The I2S interface (integrated interchip sound) is a serial bus standard for audio data transmission. The ADC interface (analog-to-digital converter) is an interface that converts analog signals to digital signals. Signal transmission between the input module 101 and the control module 102 is achieved through wireless communication technologies, such as Wi-Fi, Bluetooth, Zigbee, and so on.

The input module 101 is directly integrated into the shell of the portable fan, which is suitable for a scenario where the user wishes to operate the fan directly, such as adjusting the air speed through a touch screen or turning on and off the fan by pressing a key. The input module 101 may alternatively be separated from the portable fan and mounted on another electronic device (such as a smart phone, a tablet computer, a smart watch, and so on). The input module 101 may be wirelessly connected to the control module of the fan, such that the portable fan can be controlled more flexibly and conveniently. The user can remotely control the portable fan through any available electronic device. A wireless module may be a Bluetooth module, a Wi-Fi module, an infrared module, a 433 MHz wireless module or any of the following wireless modules: a Zigbee module, a Z-Wave module, a Long Range (LoRa) module, Near Field Communication (NFC), a 2.4 GHz dedicated wireless module, 5G, and so on. The control module 102 receives signals from the input module 101 and performs signal processing to generate the switch control signal based on the switch control signal to control the high-speed three-phase motor 104 to start or stop operating. The control module 102 may calculate the control signal for adjusting the portable fan based on the air speed adjustment signal, and the control signal includes, but not limited to, the pulse width modulation (PWM) signal, a pulse position modulation (PPM) signal, a data protocol, or other customized protocols. The PWM signal is a commonly used control method, in which a duty cycle (i.e., a ratio of a time length at a high level to a period) of the signal is changed to adjust the rotation speed of the motor. The PPM signal conveys information by changing a position of a pulse in a period. The data protocol may be a standard communication protocol (such as I2C, SPI, UART) or any customized communication protocol for transmitting more complex control instructions. For the customized protocol, control signal formats and transmission methods are particularly designed based on specific application requirements. When the input module 101 is the voice module 112, the control module 102 generates the switch control signal and the PWM control signal based on the switch signal and the air speed adjustment control signal. When the input module 101 is the networking module 106, the control module 102 generates a corresponding control signal according to a remote control signal. The drive module 103 includes three bridge arms. Each of the three bridge arms includes an upper bridge arm transistor switch and a lower bridge arm transistor switch, which are connected to a phase coil of the high-speed three-phase motor 104. The control module 102 controls each transistor switch of each bridge arm via the switch control signal to control the high-speed three-phase motor 104 to start or stop operating. The control module 102 controls each transistor switch of each bridge arm via the PWM control signal to adjust the rotation speed of the high-speed three-phase motor 104. Controlling the motor to start and stop operating and adjusting the rotation speed of the motor can be achieved based on a six-step phase switching method. Only two MOS transistor are conducted at one time point, such that an efficient current path is formed to drive the motor. By controlling the three bridge arms (each having two MOS transistors), six phase change states are achieved to drive the motor. Each phase change state corresponds one pair of conducted MOS transistors, and the remaining MOS transistors are off. The high-speed three-phase motor 104 receives signals from the driver module 103 to start operating and provide a corresponding air speed.

According to the present embodiment 1, the control module generates, based on the switch signal and the air speed adjustment control signal output from the input module, the switch control signal and the PWM control signal. The user can adjust an operation state of the fan and the air speed according to demands, such that the air speed is adjusted flexibly. Compared to the traditional mechanical switching method, in the present embodiment, the user can select an appropriate air speed according to specific needs, and the fan can be used more conveniently and comfortably, the user experience is improved.

Figure 3:
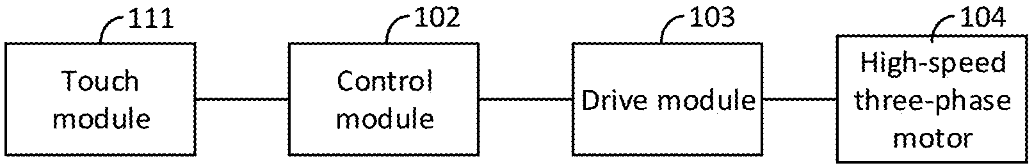
FIG. 3 is another structural schematic view of the portable fan configured with the high-speed three-phase motor according to an embodiment of the present disclosure.

In an embodiment, as shown in FIG. 3, when the input module 101 is the touch module 111, the touch module 111 outputs the switch signal when detecting the touch action, and the control module 102 generates the switch control signal according to the switch signal. The touch module 111 outputs the air speed adjustment signal when detecting the sliding action, and the control module 102 calculates the duty cycle of the PWM signal according to the air speed adjustment signal and generates the air speed adjustment signal according to the duty cycle of the PWM signal.

The touch control module 111 detects the touch action and the sliding action of the user. When the user touches the touch control module 111, the touch control module 111 detects the touch action and generates the switch signal. When the user slides on the touch control module 111, the touch control module 111 detects a sliding parameter and generates the air speed adjustment signal. The control module 102 receives and processes the switch signal and generates the switch control signal to control the high-speed three-phase motor 104 to start or stop operating. The control module 102 receives and processes the air speed adjustment signal, and calculates a desired duty cycle of the PWM signal based on the air speed adjustment signal.

A method of the control module 102 calculating the duty cycle of the PWM signal is determined based on the sliding parameter. The sliding parameter may include: a sliding distance; a sliding speed; a sliding direction; and a sliding position. The sliding distance refers to a distance for which a finger of the user slides on a touch region. The sliding speed refers to a speed at which the finger slides. The sliding direction refers to a direction in which the finger slides (such as upward and downward, leftward and rightward). The sliding position refers to a starting position and an ending position of the sliding.

Operations for calculating the duty cycle, taking the sliding distance as a main parameter, are as follows:

When the user starts sliding on the touch region, the starting position is recorded. When the user stops sliding on the touch region, the ending position is recorded. A distance between the starting position and the ending position is recorded as the sliding distance. For example, when the starting position is P1 and the ending position is P2, the sliding distance D can be expressed as D=P2−P1. A maximum distance Dmax that the user can slide on the touch region is defined. The recorded sliding distance D is compared with the maximum sliding distance Dmax. A percentage R of the sliding distance to the maximum distance is calculated, ensuring that the R is between 0 and 1. A minimum value and a maximum value of the duty cycle of the PWM signal are set. For example, the minimum value is 0% and the maximum value is 100%. According to the percentage of the sliding distance, the duty cycle of the PWM signal is calculated correspondingly. The PWM control signal is output according to the duty cycle of the PWM signal, the generated PWM control signal is sent to the drive module 103 to adjust the rotation speed of the high-speed three-phase motor 104 to achieve a change in the air speed.

Operations for calculating the duty cycle, taking a sliding time length as a main parameter, are as follows:

When the user slides on the touch region, the touch control module 111 detects the sliding action and records a sliding start time point and a sliding end time point. The touch module 111 transmits the sliding time points to the control module 102, the control module 102 calculates a normalized sliding time length based on the sliding time points and generates the corresponding duty cycle of the PWM signal. The control module 102 sends the PWM signal to the drive module 103, and the drive module 103 controls the rotation speed of the high-speed three-phase motor 104 by adjusting a switching frequency of each transistor switch and the duty cycle of each transistor switch.

Operations for calculating the duty cycle, taking touch positions as a main parameter, are as follows:

When the user touches a position on the touch control module 111, the touch control module 111 detects coordinates of the touched position (such as coordinates (X, Y)). The touch control module 111 generates the air speed adjustment signal by taking the coordinates of the touched position as a touch parameter. Depending on a location of the touched position, the control module 102 calculates the desired duty cycle of the PWM signal. For example, the touch region is divided into a plurality of regions, each of the plurality of regions corresponds to a unique air speed. In an example, the touch region of the touch module 111 is divided into five equal regions. Touching each of the five regions corresponds to one air speed, a region 1 (leftmost) is a low air speed, a region 2 (center) is a medium air speed, and a region 5 (rightmost) is a high air speed. The user touches the rightmost region (the region 5), the touch module 111 detects coordinates of the touched position and generates the corresponding air speed adjustment signal. The control module 102 receives the air speed adjustment signal and calculates, according to the touched position (the region 5), the duty cycle of the PWM signal required for the corresponding air wind speed. The control module 102 generates the PWM control signal and sends the PWM control signal to the drive module 103. The drive module 103 adjusts the rotation speed of the high-speed three-phase motor 104 to reach the high air speed by controlling a conducted time length of each of the upper bridge arm transistor switch and the lower bridge arm transistor switch.

In an embodiment, the touch control module 111 may be configured with a touch-slide adjustment chip having a plurality of contacts. When the user operates the fan via the touch screen, the touch-slide adjustment chip detects the touch action via the plurality of contacts. When a pressure caused by the touch action is detected, the touch control module 111 generates the switch signal. The touch-slide adjustment chip transmits the switch signal to the control module 102. After receiving the switch signal, the control module 102 generates the switch control signal to control the transistor switch in the drive module 103 to control the high-speed three-phase motor 104 to start or stop operating, i.e., to turn on or off the fan. In addition to detecting the touch action, the touch-slide adjustment chip is further configured to detect the sliding parameters performed by the user on the touch screen, including a sliding gesture, the sliding distance, the sliding speed, the number of slides, and the sliding time length. These parameters are transmitted to the control module 102 through the touch module 111. The control module 102 generates the corresponding PWM control signal according to a preset logic to adjust the air speed of the portable fan. The control module 102 generates the corresponding PWM control signal according to the sliding parameters, and the PWM control signal is configured to control the transistor switch in the drive module 103 to adjust the rotation speed of the high-speed three-phase motor 104 to adjust the air speed.

The touch-slide adjustment chip is arranged with the plurality of contacts. When the user performs a touch-sliding operation on any of the plurality of contacts, the chip detects the touch action and the sliding parameters (such as the sliding distance, the sliding speed). The sliding parameters detected by the chip include the sliding distance and the sliding speed at which the user slides on the touch screen. These parameters reflect the extent to which the user wishes to adjust the air speed. According to the detected sliding parameters, the touch-slide adjustment chip generates the air speed adjustment control signal. The control module receives the air speed adjustment control signal and calculates, based on a magnitude of the air speed adjustment control signal, the corresponding duty cycle of the PWM signal. When the duty cycle is larger, the rotation speed of the motor is greater. When the duty cycle is smaller, the rotation speed of the motor is lower. The control module sends the generated PWM signal to the drive module, the drive module controls the rotation speed of the motor. By adjusting the duty cycle of the PWM signal, the rotation speed of the motor is precisely controlled, such that the air speed of the fan is adjusted.

Figure 4:
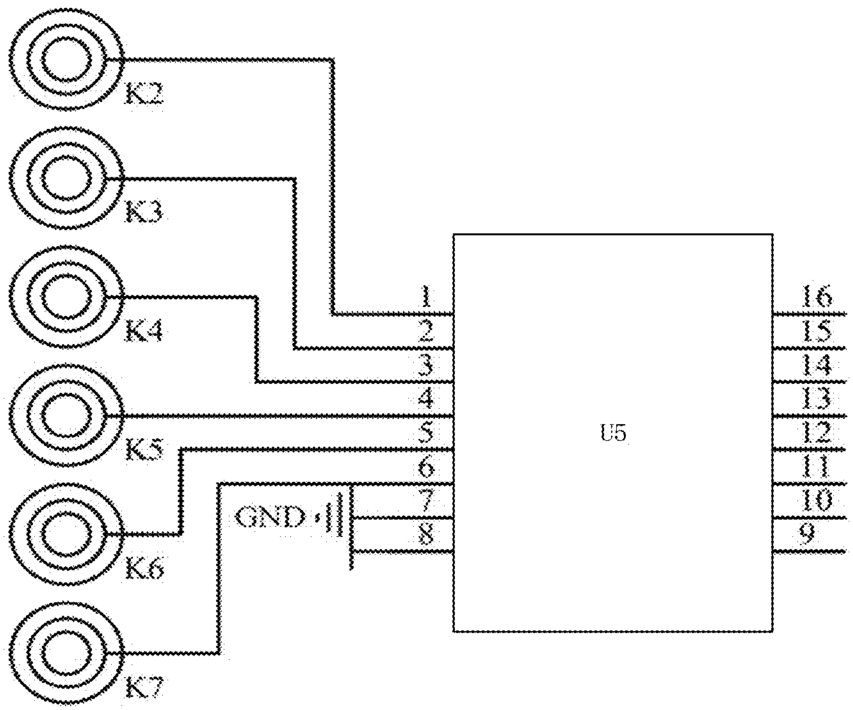
FIG. 4 is a circuit diagram of a touch slide adjustment chip arranged in the portable fan configured with the high-speed three-phase motor according to an embodiment of the present disclosure.

In an example, as shown in FIG. 4, U5 is a touch control chip, and pins PA0 to PA4 of the touch control chip U5 can be connected to the control module 102 through the connection manner described above. The touch control chip U5 at least includes a contact K2, a contact K3, a contact K4, a contact K5, a contact K6, and a contact K7. Each of the contacts can detect the touch action. Various contacts can operate cooperatively to detect the sliding gesture, the sliding distance, the sliding speed, the number of slides, the sliding time length, and other sliding parameters.

In the present embodiment, compared to the traditional portable fan which is arranged with only one mechanical switch to control the air speed in a single way, the touch module of the present embodiment enables more diversified control modes to be achieved. The user can turn on and off the fan by performing a simple touch and can adjust the air speed flexibly by performing the sliding operation. The touch-slide adjustment chip is arranged to enable the fan to be operated more conveniently and intuitively. The user does not need to repeatedly press the mechanical switch but can perform the touch action and the sliding action to simply turn on and off the fan and to adjust the air speed of the fan. An operation efficiency and usage experience are improved. The control module generates the accurate PWM control signal based on the detected sliding parameters to precisely control the air speed of the fan. The user can flexibly adjust the air speed according to needs to obtain a more comfortable usage experience.

In another embodiment, the touch control module 111 may be a touch screen chip, including a single channel touch, a multi-channel touch, a touch screen, and so on. The touch-slide screen chip includes a switch region and a sliding region. The touch-slide screen chip generates the switch touch signal through the switch region and generates the corresponding air speed adjusting control signal when detecting the sliding parameters through the sliding region.

The touch control module 111 of the portable fan is arranged with the touch screen chip that includes the switch region and the sliding region. When the user touches the switch region, the touch screen chip detects the touch action and generates the switch signal. When the user performs the sliding action in the sliding region, the touch screen chip detects the sliding parameters and generates the corresponding air speed adjustment control signal. The touch module 111 sends the generated switch signal and the air speed adjustment control signal to the control module 102, the control module 102 receives the switch signal and generates the switch control signal and controls, based on the switch control signal, each transistor switch of each bridge arm to control the motor to start or stop operating. After receiving the air speed adjustment control signal, the control module 102 generates the PWM control signal and controls, based on the PWM control signal, at least one transistor switch of each bridge arm to adjust the rotation speed of the high-speed three-phase motor 104 to achieve the air speed adjustment.

Figure 5:
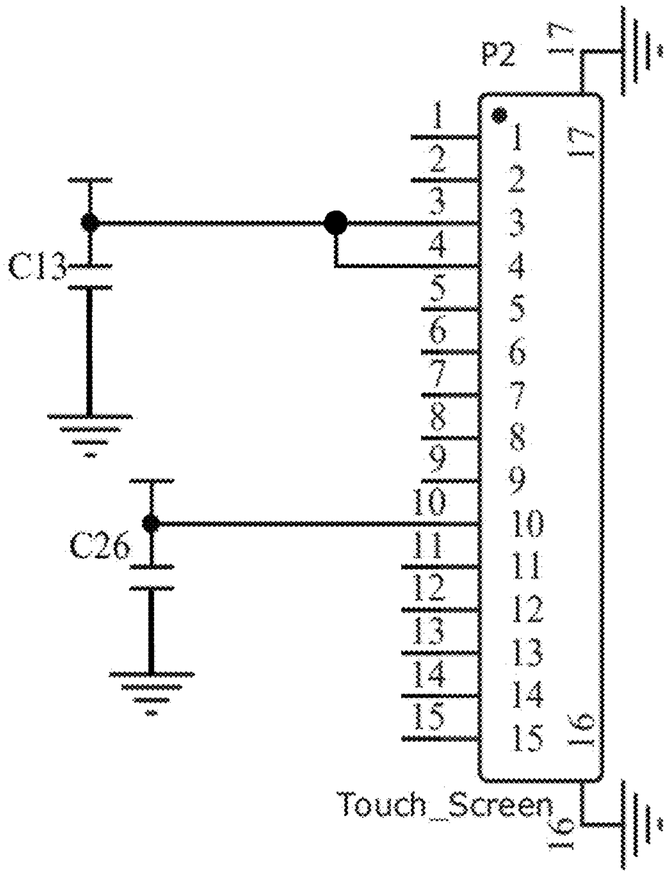
FIG. 5 is a circuit diagram of a touch screen connector arranged in the portable fan configured with the high-speed three-phase motor according to an embodiment of the present disclosure.
Figure 6:
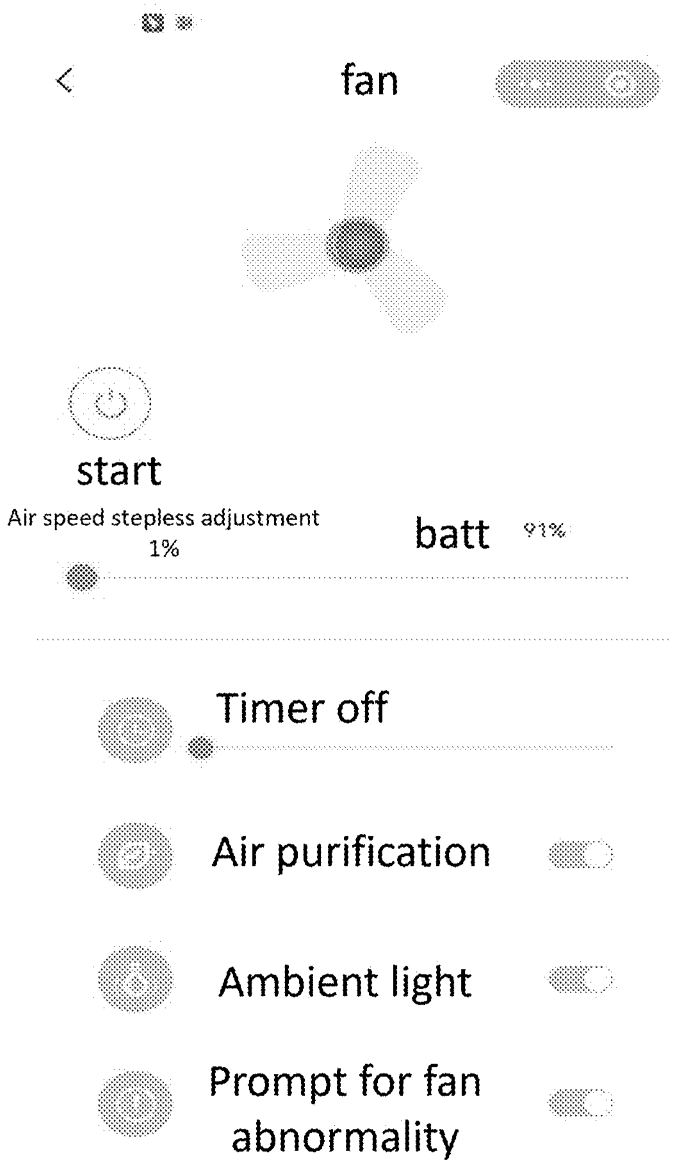
FIG. 6 is a displaying interface of a control device arranged in the portable fan configured with the high-speed three-phase motor according to an embodiment of the present disclosure.

In an example, as shown in FIG. 5, pins 5 to 9 of a touch screen connector P2 are connected to the touch screen, and pins 12 to 15 of the touch screen connector P2 are connected to the control module 102 through the connection manner described above. As shown in FIG. 6, a control interface is displayed on a screen of a mobile terminal, the control interface includes an on/off button, an air speed adjustment button, a timer off button, an air purification button, an ambient light button, a fan abnormality reminder. Different functions can be achieved by clicking the buttons. The buttons illustrated herein are only examples, and do not limit the present disclosure.

According to the present embodiment, by arranging the touch screen chip, the user can easily achieve switch control and the air speed adjustment of the fan. Operations are simple and intuitive, various demands of the user are met. The touch screen chip performs detection at the switch region and the sliding region to achieve flexible switch control and the air speed adjustment. The user can accurately control the air speed according to the needs, more comfortable usage experience is provided. Arranging the touch screen enhances a technological sense and modernity of the portable fan, the user experience is improved, and the product may be more competitive in the market.

In a third embodiment, the touch control module 111 includes a plurality of single-contact touch chips that are connected in parallel to each other. The touch control module 111 generates the switch touch signal when the touch action is detected by any single contact of the plurality of single-contact touch chips and generates the corresponding air speed adjustment control signal when the sliding parameters are detected by the plurality of single-contact touch chips.

The touch control module 111 of the portable fan includes the plurality of single-contact touch chips or a single chip formed by a plurality of contacts integrated with each other. When the user touches any single contact of the plurality of single-contact touch chips, the touch control module 111 generates the switch signal. When the user slides on the touch screen, the plurality of single-contact touch chips detect the sliding parameter and generate the corresponding air speed adjustment control signal. The touch module 111 sends the generated switch touch signal and the air speed adjustment control signal to the control module 102. The control module 102 receives the switch touch signal and generates a conduction level signal and controls, based on the conduction level signal, each transistor switch of each bridge arm to control the motor to start or stop operating. After receiving the air speed adjustment control signal, the control module 102 generates the PWM control signal and controls, based on the PWM control signal, at least one transistor switch of each bridge arm to adjust the rotation speed of the high-speed three-phase motor 104 to achieve the air speed adjustment.

Figure 7:
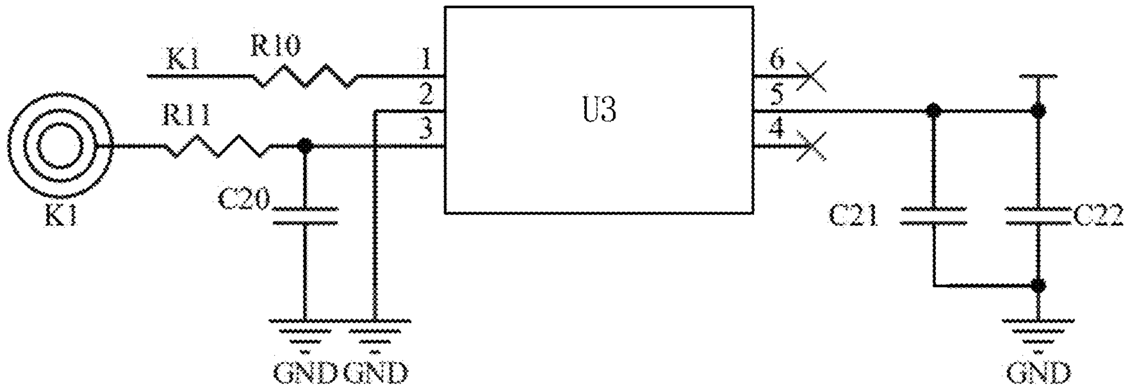
FIG. 7 is a circuit diagram of a single-touch touch screen chip arranged in the portable fan configured with the high-speed three-phase motor according to an embodiment of the present disclosure.

In an example, as shown in FIG. 7, the U3 is a single-contact touch chip and is connected to the control module 102 through a pin 1 via a resistor R10. A pin 3 of the single-contact touch chip U3 is connected to a contact K1 through a resistor R11. The above function can be achieved by connecting the plurality of single-contact touch chips in parallel to each other.

In the present embodiment, since the plurality of single-contact touch chips are connected in parallel to each other, the user can easily control the fan to be turned on and off and adjust the air speed. Operations are simple and intuitive, various demands of the user can be met. The touch-slide adjustment chip takes the plurality of single contacts to detect the touch action to achieve flexible air speed adjustment. The user can precisely control the air speed of the fan according to the needs, more comfortable usage experience is provided. By arranging the touch screen, the technological sense and modernity of the portable fan are improved, improving the usage experience, and the product is more competitive in the market.

Figure 8:
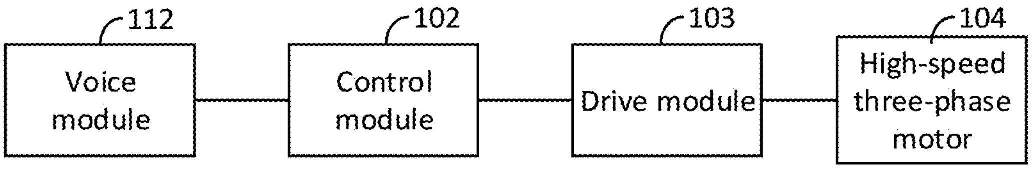
FIG. 8 is another structural schematic view of the portable fan configured with the high-speed three-phase motor according to an embodiment of the present disclosure.

In an embodiment, as shown in FIG. 8, when the input module 101 is the voice module 112, the voice module 112 captures a voice signal of the user and converts the voice signal into the switch signal and the air speed adjustment control signal. The control module 102 generates the switch control signal and the PWM control signal according to the switch signal and the air speed adjustment control signal, respectively.

The user sends a voice instruction through the voice module 112, such as “turn on the fan”, “turn off the fan” or “adjust the air speed”. A microphone of the voice module 112 captures the voice signal of the user. The voice module 112 transmits the captured voice signal to a voice recognition unit. The voice recognition unit converts the voice signal into the switch signal and the air speed adjustment control signal correspondingly. The voice module 112 sends the switch signals and the air speed adjustment control signal to the control module 102. The control module 102 generates the control signal correspondingly according to the switch signal and the air speed adjustment control signal. When the voice instruction is “turn on the fan” or “turn off the fan”, the voice instruction corresponds to the switch signal, and the control module 102 generates the switch control signal. When the voice instruction is related to air speed adjustment, such as “adjust the air speed”, the voice instruction corresponds to the air speed adjustment control signal, and the control module 102 generates the PWM control signal. The control module 102 controls, based on the switch control signal, the transistor switch in the drive module 103 to drive the high-speed three-phase motor 104 to start or stop operating. The control module 102 adjusts the duty cycle of the PWM signal according to the air speed adjustment control signal to generate the corresponding PWM control signal. The control module 102 sends the PWM control signal to the drive module 103 to adjust the switching frequency and the duty cycle of the transistor switch of the upper bridge arm or the lower bridge arm to control the rotation speed of the high-speed three-phase motor 104.

In the present embodiment, the user does not need to manually operate the mechanical switch or the touch panel but can control the portable fan conveniently through the voice instruction. The rotation speed of the motor is controlled by the PWM signal, ensuring the air speed to be adjusted smoothly and accurately, such that the user can have a better usage experience.

Figure 9:
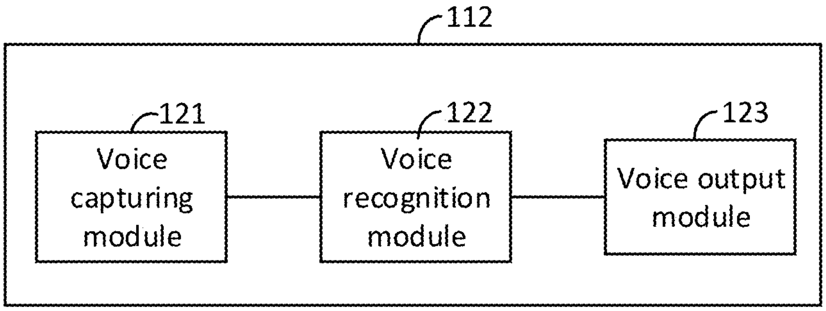
FIG. 9 is a structural schematic view of a voice module arranged in the portable fan configured with the high-speed three-phase motor according to an embodiment of the present disclosure.

In an implementation, as shown in FIG. 9, the voice module 112 includes a voice capturing module 121, a voice recognition module 122, and a voice output module 123. The voice recognition module 122 is connected to the voice capturing module 121, the voice output module 123, and the control module 102. The voice capturing module 121 captures voice signal of the user, and the voice recognition module 122 converts the voice signal into the switch signal and the air speed adjustment control signal and sends the switch signal and the air speed adjustment control signal to the control module 102. The voice recognition module 122 controls the voice output module 123 to output or not output an execution result according to a feedback result from the control module 102.

The voice capturing module 121 is configured to capture the voice signal of the user and is substantially formed by the microphone to convert a voice input into an electrical signal. The voice recognition module 122 converts the captured voice signal into the switch signal and the air speed adjustment control signal. The voice recognition module 122 processes, based on a voice recognition algorithm and related techniques, the voice signal into a recognizable signal instruction to be parsed and executed by the control module 102 subsequently. Specifically, the voice recognition module 122 pre-processes the captured voice signal, including signal amplification, filtering, and denoising, to ensure a subsequent process to be performed accurately and stably. The pre-processed voice signal are converted into a digitized feature vector. In the present step, techniques such as Mel Frequency Cepstral Coefficients (MFCC) may be applied to extract features from the voice signal. A voice recognition model is trained based on a large amount of labeled voice data. Commonly used techniques include Hidden Markov Models (HMM), Deep Learning Models (such as Recurrent Neural Networks RNN, Long Short-Term Memory Networks LSTM), and so on. The feature vector is input into the voice recognition model to be recognized and decoded. The model maps a feature vector sequence to an instruction sequence. The instruction obtained after decoding is output. A voice type may be instructing the fan to be turned on or off. For example, turning on the fan corresponds to 0x01, turning off the fan corresponds to 0x02. The voice type may be instructing to adjust the air speed of the fan. For example, increasing the air speed corresponds to 0x03, decreasing the air speed corresponds to 0x04. The voice type can be a specific air speed level and setting the air speed level directly. For example, a low air speed corresponds to 0x10, a medium air speed corresponds to 0x11, and a high air speed corresponds to 0x12. In addition, other texts may be used to replace turning on the fan, turning off the fan, increasing the air speed, and decreasing the air speed, as mentioned in the above. The signal output by the voice module 112 may be a single-byte or multi-byte data packet, depending on complexity of the instruction and systemic design. For example, a single-byte signal may be 0x01 (indicating that the fan needs to be turned on), and a multi-byte signal may be 0x01 0x02 (indicating that the fan needs to be turned on and set to a second air speed level).

In an example, the user says "turn on the fan", the voice module 112 recognizes the instruction and generates the signal 0x01, and the voice module 112 sends the signal 0x01 to the control module 102. The user says "increase the air speed", the voice module 112 recognizes the instruction and generates the signal 0x03, and the voice module 112 sends the signal 0x03 to the control module 102. The user says "adjust the air speed to the medium speed", the voice module 112 recognizes the instruction and generates the signal 0x11, and the voice module 112 sends the signal 0x03 to the control module 102.

Figure 10:
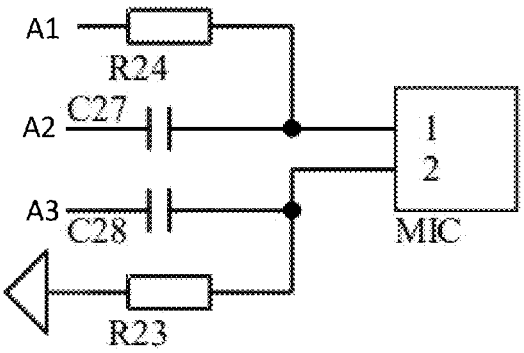
FIG. 10 is a circuit diagram of a voice collection module of the voice module arranged in the portable fan configured with the high-speed three-phase motor according to an embodiment of the present disclosure.
Figure 11:
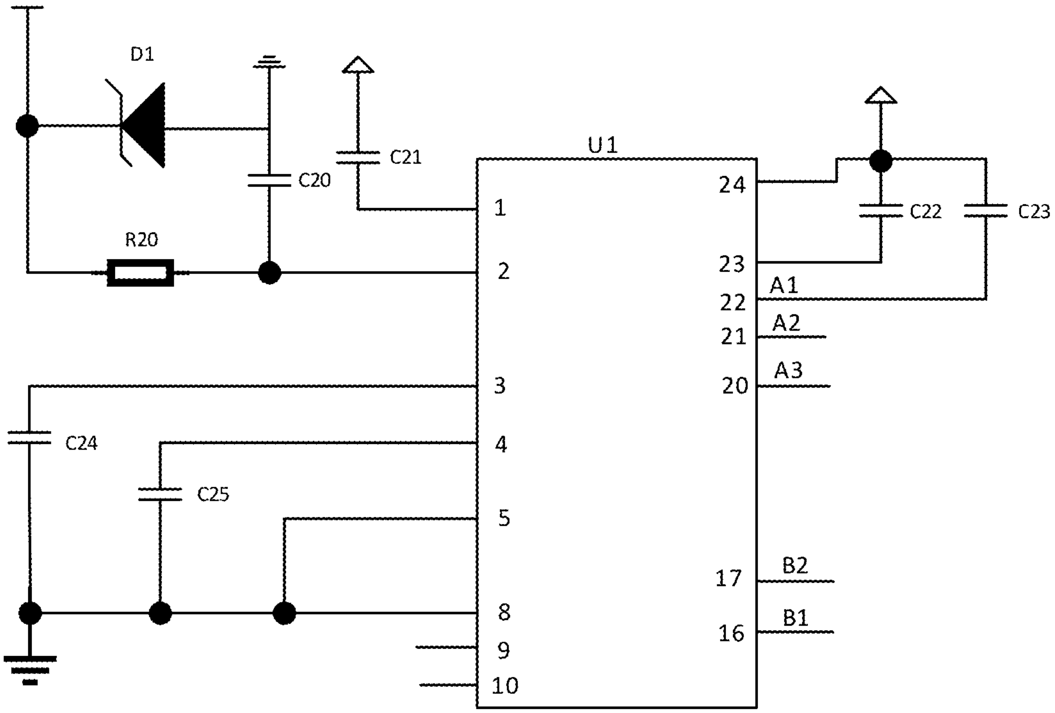
FIG. 11 is a circuit diagram of a voice recognition module of the voice module arranged in the portable fan configured with the high-speed three-phase motor according to an embodiment of the present disclosure.

In an example, as shown in FIGS. 10 and 11, the voice capturing module 121 includes the microphone MIC, a resistor R23, a resistor R24, a capacitor C27, and a capacitor C28. A first end of the microphone MIC is connected to a second end of the resistor R24 and a second end of the capacitor R27. A second end of the microphone MIC is connected to a second end of the resistor R23 and a second end of the capacitor R28. The voice recognition module 122 includes a voice recognition chip U1, a pin 1 of the voice recognition chip U1 is connected to an end of the capacitor C21, a pin 2 of the voice recognition chip U1 is connected to an end of the capacitor C20 and an end of the resistor R20. The other end of the capacitor C20 and an anode of a voltage regulator D1 are grounded. The other end of the resistor R20 and a cathode of the voltage regulator D1 are co-connected to a high level. A pin 3 of the voice recognition chip U1 is connected to an end of the capacitor C24. A pin 4 of the voice recognition chip U1 is connected to an end of the capacitor C25. A pin 5 of the voice recognition chip U1, the other end of the capacitor C24 and the other end of the capacitor C25 are grounded. A pin 24 of the voice recognition chip U1, an end of the capacitor C22, an end of the capacitor C23, the other end of the capacitor C21 are connected to a same level. A pin 23 of the voice recognition chip U1 is connected to the other end of capacitor C22. A pin 22 of the voice recognition chip U1 is connected to the other end of capacitor C23. The pin 22, the pin 21, and the pin 20 of the voice recognition chip U1 are respectively connected to a connection point A1, a connection point A2, and a connection point A3 of the voice capturing module 121.

An operating process of the above circuit is as follows. The microphone MIC captures the voice input of the user, the capacitor C27 and capacitor C28 convert the voice input of the user into the electrical signal and output the electrical signal to the voice recognition chip U1, and the voice recognition chip U1 converts the captured voice signal into the switch signal and the air speed adjustment control signal.

In the present embodiment, due to voice input and output, interactivity between the device and the user is improved, and the device is more user friendly. The user can easily control the fan to be turned on and off and adjust the air speed by the voice instruction without directly contacting the fan. Voice control enables the fan to have more functions. For example, the user may intelligently operate the fan through voice instructions and perform customized voice settings, improving an intelligence level of the fan and the usage experience.

Figure 12:
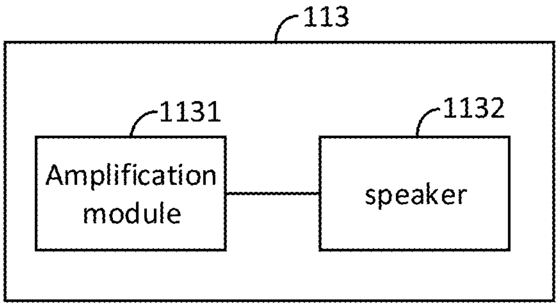
FIG. 12 is a structural schematic view of a voice output module of the voice module arranged in the portable fan configured with the high-speed three-phase motor according to an embodiment of the present disclosure.

In an embodiment, as shown in FIG. 12, the voice output module 123 includes an amplifier module 1131 and a speaker 1132, and the amplifier module 1131 is connected to the voice recognition module 122 and the speaker 1132.

The amplifier module 1131 is substantially configured to amplify the voice signal and amplifies a low-level voice signal output from the voice recognition module 122 to a high-level signal that is sufficient to drive the speaker 1132. The speaker 1132 receives the amplified voice signal from the amplifier module 1131 and converts the amplified voice signal into a voice output.

Figure 13:
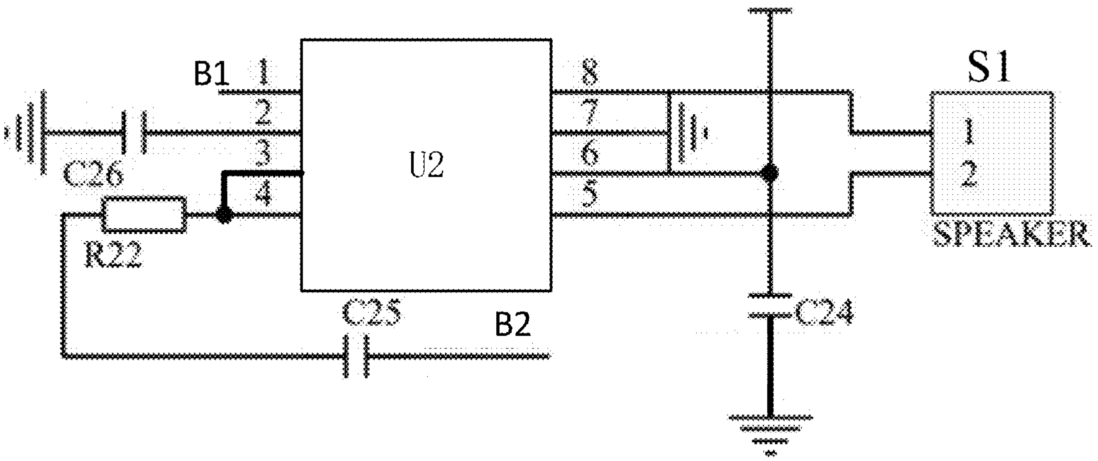
FIG. 13 is a circuit diagram of a voice output module of the voice module arranged in the portable fan configured with the high-speed three-phase motor according to an embodiment of the present disclosure.

In an example, as shown in FIG. 13, the voice output module 123 includes an amplifier chip U2 and the speaker S1, and an end B1 and an end B2 of the amplifier chip U2 are connected to a pin 16 and a pin 17 of the voice recognition chip U1, respectively. The amplifier chip U2 is configured to amplify the voice signal and then output voice from the speaker S1.

In the present embodiment, by arranging the amplifier module, it is ensured that the voice signal is not lost or distorted during transmission, and the speaker can be driven by a sufficient volume, such that the user can clearly hear a voice output result.

Figure 14:
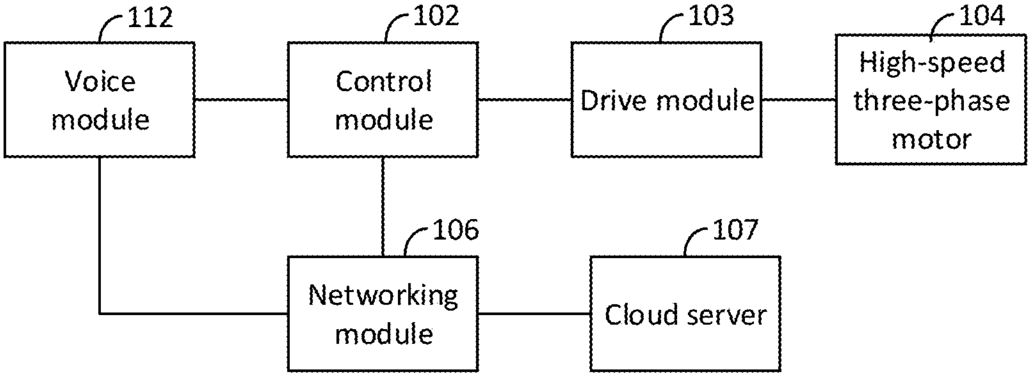
FIG. 14 is another structural schematic view of the portable fan configured with the high-speed three-phase motor according to an embodiment of the present disclosure.

In an embodiment, as shown in FIG. 14, the portable fan further includes the networking module 106. The networking module 106 is connected to the voice module 112 and the control module 102. The voice module 112 uploads the voice signal to a cloud server 107 via the networking module 106. The cloud server 107 converts the voice signal into the switch signal and the air speed adjustment control signal and outputs the switch signal and the air speed adjustment control signal to the networking module 106. The networking module 106 sends the switch signal and the air speed adjustment control signal to the control module 102.

A voice recognition service and a remote control function of the cloud server 107 can be utilized by means of networking to further improve recognition accuracy and flexibility of the system. Specifically, the microphone is used to capture the voice signal, the voice signal is transmitted to the networking module 106 through analog-to-digital conversion. The networking module 106 uploads the captured voice signal to the cloud server 107 for the voice recognition service, and the cloud server 107 converts the voice signal into the switch signal and the air speed adjustment control signal and returns the switch signal and the air speed adjustment control signal to the networking module 106. The networking module 106 sends the switch signal and the air speed adjustment control signal returned from the cloud server to the control module 102. The control module 102 generates the corresponding control signal based on the voice instruction, such as "turn on the fan" or "turn off the fan", or other switch instructions may be set customizedly to increase usage convenience and interest. For example, possible customized switch instructions may be "fan on", "fan off", "start blowing", "I'm hot, turn on the fan", and so on. The switch instructions can be expanded according to habits and preferences of the user, improving an interactive experience. The switch control signal is generated based on the voice instruction. The control module 102 calculates, according to the voice instruction of "increase the air speed" or "decrease the air speed", the duty cycle of the corresponding PWM signal and generates the PWM control signal. The drive module 103 drives the motor, according to the received switch control signal and PWM control signal, to control the fan to be turned on/off and to adjust the air speed.

In the present embodiment, since the voice recognition is performed on the cloud server, the cloud server has a more powerful computing capability and a more efficient voice recognition algorithm, the voice instruction of the user can be more accurately recognized, improving recognition accuracy. The voice recognition is completed at the cloud server, a computational burden of the portable fan is reduced, the portable fan may be configured with lower-cost hardware, and a battery duration may be extended. By arranging the networking module, the portable fan can be linked with other intelligent devices to achieve remote control and data analysis, further improving the user experience and the intelligence level of the fan.

Figure 15:
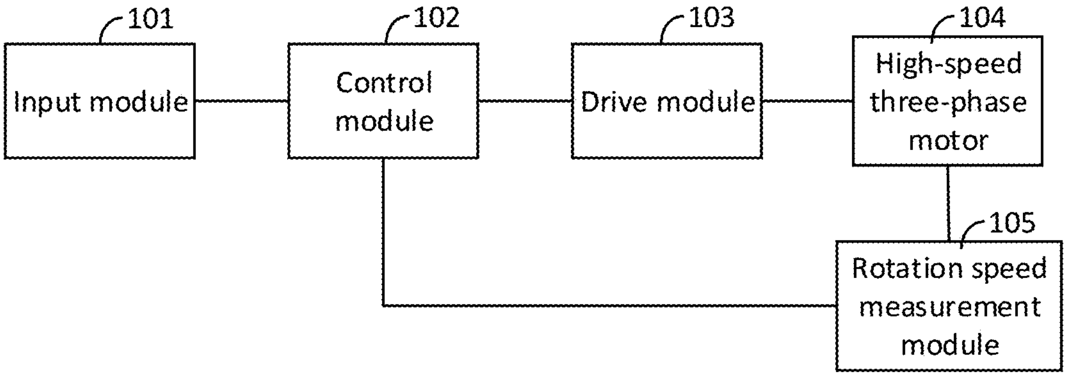
FIG. 15 is another structural schematic view of the portable fan configured with the high-speed three-phase motor according to an embodiment of the present disclosure.

In an embodiment, as shown in FIG. 15, the portable fan further includes a rotation speed measurement module 105. The rotation speed measurement module 105 is connected to the high-speed three-phase motor 104 and the control module 102. The rotation speed measurement module 105 is configured to measure an actual rotation speed of the high-speed three-phase motor 104 and send the actual rotation speed to the control module 102. The control module 102 obtains an amount of rotation speed variation based on the actual rotation speed and a target rotation speed, adjusts the duty cycle of the PWM signal according to the rotational speed variation, and outputs the adjusted PWM control signal to the drive module 103.

In the present embodiment, the PWM signal is generated by performing an incremental PID control algorithm to improve smoothness of the PWM signal and improve accuracy in adjusting the rotation speed of the fan. Specifically, for the incremental PID control algorithm, an error between a current and a plurality of previous times is calculated to adjust a control amount to accurately control a system. The incremental PID control algorithm includes a proportion (P) control, an integral (I) control, and a differential (D) control. For the P control, a proportional adjustment is performed on a current error. For the I control, a cumulative adjustment is performed on past errors. For the D control, adjustment is performed on a variation rate of the current error. A PWM module and a timer are initialized. Parameters required by the PID control algorithm are set (a proportional coefficient Kp, an integral coefficient Ki, a differential coefficient Kd). Sensor data are obtained. The rotation speed measurement module 105 may be a magnetic encoder or a Hall sensor. The rotation speed measurement module 105 measures of the rotation speed of the motor in real time and feeds the rotation speed back to the control module 102. The control module 102 calculates, based on the set target rotation speed and the actual measured rotation speed, the current error; calculates an incremental control amount based on the current error; adjusts the duty cycle of the PWM signal; and outputs the PWM signal to control the rotation speed of the high-speed three-phase motor 104.

In the present embodiment, the PID control algorithm adjusts the control amount according to errors, such that set values can be accurately tracked, and the rotation speed of the motor can be quickly stabilized near a target value. The PID control algorithm responds quickly to a change in errors and can timely adjust the PWM signal when a load changes. Therefore, it is ensured that the air speed is adjusted flexibly and accurately. Furthermore, the PWM control signal can be precisely adjusted based on the PID control algorithm, enabling the air speed to be smoothly transitioned.

In an embodiment, when the control module 102 detects a change in the operating voltage, the operating voltage is controlled within a constant voltage range by boosting or bucking the voltage.

When the control module 102 detects a change in the operating voltage, in order to maintain the motor to operate stably, the control module may adjust the operating voltage to be within a preset constant voltage range by a boost circuit or a buck circuit. The control module 102 continuously monitors an input voltage and triggers a voltage adjustment mechanism when detecting that the voltage deviates from the preset range (such as 6-8.4 V). The control module 102 controls a boost or buck converter. For example, when the input voltage is below the preset range, the control module 102 enables the boost circuit to increase the voltage to be within the preset range. Conversely, when the input voltage is higher than the preset range, the control module 102 enables the buck circuit to reduce the voltage to be within the preset range. The control module 102 can adjust, based on a feedback loop, the amount of boosting or bucking in real time to ensure that the output voltage is constantly within the preset range.

In an embodiment, when the control module 102 detects a change in the operating current, the control module 102 adjusts the PWM control signal to control the operating current to be within a constant current range.

When the control module 102 detects a change in the operating current, the control module 102 adjusts the PWM control signal to control the current to be maintained within the constant range. The control module 102 continuously monitors the operating current of the motor. When the current is detected to deviate from a preset range (such as 0.12-1 A), the current adjustment mechanism is triggered. The control module 102 adjusts the duty cycle of the PWM signal to change an input power of the motor. For example, when the current is detected to be below the preset range, the duty cycle of the PWM signal is increased to increase the input power and increase the current. Conversely, when the current is higher than the preset range, the duty cycle of the PWM signal is decreased to decrease the input power and to decrease the current. The control module 102 adjusts, based on a feedback from a current sensor, the duty cycle of the PWM signal in real time to ensure that the operating current to be within the constant range.

In an embodiment, when the control module 102 detects a change in the operating power, the control module 102 adjusts the operating voltage or the operating current to keep the operating power stable.

The control module 102 continuously monitors the operating power of the motor ($P=V\times I$) and triggers a power adjustment mechanism when detecting that the operating power deviates from a preset value. By controlling the boost or buck converter, the input voltage is adjusted to restore the operating power to the preset value. For example, when the operating power is lower than the preset value, the input voltage is increased to increase the operating power; when the operating power is higher than the preset value, the input voltage is decreased to decrease the operating power. The operating power is restored to the preset value by adjusting the PWM signal and the current. For example, when the operating power is lower than the preset value, the duty cycle of the PWM signal is increased to increase the current and increase the operating power; when the power is higher than the preset value, the duty cycle of the PWM signal is decreased to decrease the current and decrease the operating power. The control module 102 adjusts, based on control signal feedback, the voltage or current in real time to ensure that the operating power to be within the constant range.

In the above embodiment, the control module monitors the operating voltage, the current, and the operating power of the motor in real time to ensure, based on corresponding adjustment mechanisms, that the motor can operate stably under various operating conditions, improving an efficiency and performance of the motor and ensuring the portable fan to operate in various environments reliably and stably.

Figure 16:
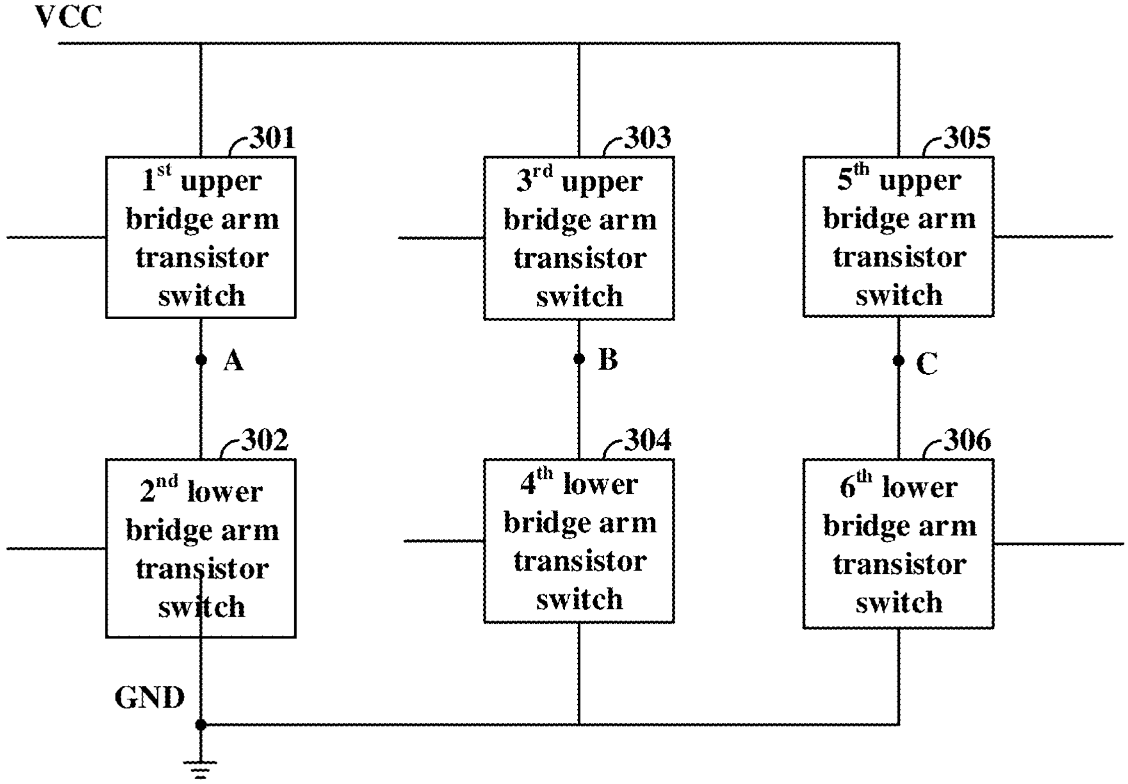
FIG. 16 is a structural schematic view of a drive module arranged in the portable fan configured with the high-speed three-phase motor according to an embodiment of the present disclosure.
Figure 17:
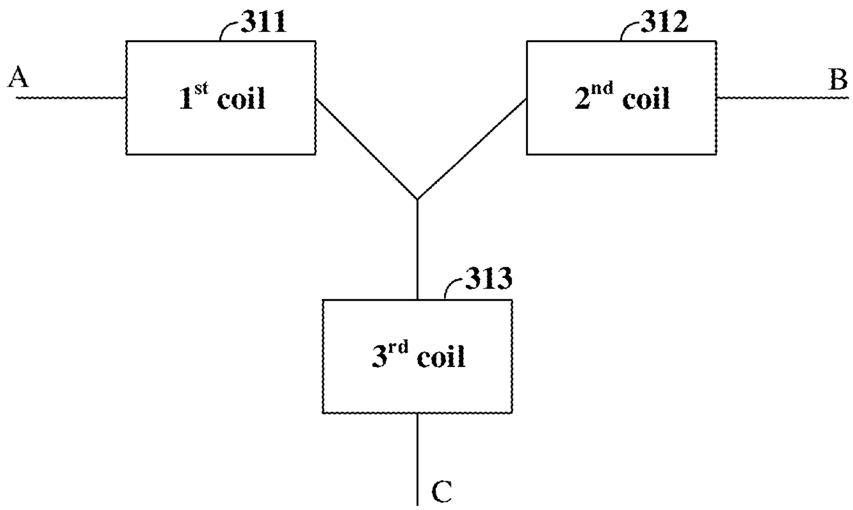
FIG. 17 is a structural schematic view of a motor arranged in the portable fan configured with the high-speed three-phase motor according to an embodiment of the present

In an embodiment, as shown in FIGS. 16 and 17, the first bridge arm includes a first upper bridge arm transistor switch 301 and a second lower bridge arm transistor switch 302. The second bridge arm includes a third upper bridge arm transistor switch 303 and a fourth lower bridge arm transistor switch 304. The third bridge arm includes a fifth upper bridge arm transistor switch 305 and a sixth lower bridge arm transistor switch 306. A center point of the first bridge arm is connected to a first coil 311, a center point of the second bridge arm is connected to a second coil 312, a center point of the third bridge arm is connected to a third coil 313. The first upper bridge arm transistor switch 301, the first coil 311, the second coil 312, and the fourth lower bridge arm transistor switch 304 cooperatively form a first loop. The first upper bridge arm transistor switch 301, the first coil 311, the third coil 313, and the sixth lower bridge arm transistor switch 306 cooperatively form a second loop. The third upper bridge arm transistor switch 303, the second coil 312, the third coil 313, and the sixth lower bridge arm transistor switch 306 cooperatively form a third loop. The third upper bridge arm transistor switch 303, the second coil 312, the first coil 311, and the second lower bridge arm transistor switch 302 cooperatively form a fourth loop. The fifth upper bridge arm transistor switch 305, the third coil 313, the first coil 311, and the second lower bridge arm transistor switch 302 cooperatively form a fifth loop. The fifth upper bridge arm transistor switch 305, the third coil 313, the second coil 312, and the fourth lower bridge arm transistor switch 304 cooperatively form a sixth loop.

The first bridge arm includes the first upper bridge arm transistor switch 301 and the second lower bridge arm transistor switch 302, the center point of the first bridge arm is connected to the first coil 311. The second bridge arm includes the third upper bridge arm transistor switch 303 and the fourth lower bridge arm transistor switch 304, the center point of the second bridge arm is connected to the second coil 312. The third bridge arm includes the fifth upper bridge arm transistor switch 305 and the sixth lower bridge arm transistor switch 306, the center point of the third bridge arm is connected to the third coil 313. In total, six loops are formed, and each of the six loops consists of transistor switches and coils. The control module 102 controls the six loops to be conducted one by one through the switch control signal in order to drive the motor to start operating. The control module 102 generates the switch control signal according to the received switch signal, and the switch control signal is used to control each transistor switch in each loop one by one. Specifically, the transistor switches in each bridge arm are conducted one by one based on the switch control signal, so as to use the current to drive each phase coil of the motor. As the transistor switch in each bridge arm is conducted, the current flows through one respective phase coil, and the motor starts rotating. The six loops being conducted one by one means that a plurality of phases of the motor in the fan are activated sequentially, such that the entire fan system is started. Specifically, the transistor switches of the six loops are turned on sequentially to enable each of the six loops to be conducted, when the six loops are conducted in a sequence from the first loop to the sixth loop, and the fan rotates forwardly; when the six loops are conducted in a sequence from the sixth loop to the loop, and the fan rotates reversely.

After the control module 102 receives the air speed adjustment control signal, the control module 102 generates the PWM control signal, and the PWM control signal is configured to adjust the transistor switches in each of the six loops, such that the rotation speed of the motor is adjusted.

In an embodiment, the control module further controls, based on the PWM control signal, a conduction time length of each transistor switch in each loop to adjust the rotation speed of the motor.

The control module receives the air speed adjustment control signal from the touch module or the voice module, and the air speed adjustment control signal includes an instruction of the user for adjusting the air speed of the fan. The control module 102 generates the corresponding PWM control signal based on the air speed adjustment control signal, and the duty cycle (i.e., the ratio of the time length of the high level to the entire cycle) of the PWM signal directly corresponds to the air speed of the fan. The control module 102 applies the generated PWM control signal to the two transistor switches in each loop as follows. Each transistor switch in each loop is switched on and off according to the duty cycle of the PWM signal. At the high level, the transistor switches are conducted; at the low level, the transistor switches are turned off. By adjusting the duty cycle of the PWM signal, a conduction time length of each transistor switch in each loop is controlled, such that a current flowing through the coils of the motor is adjusted. The rotation speed of the motor is positively proportional to a current strength in the coils of the motor. By adjusting the conduction time length of the transistor switches in each loop, the control module 102 can accurately control the current flowing in the high-speed three-phase motor 104, such that the rotation speed of the high-speed three-phase motor 104 is adjusted. By gradually increasing or decreasing the duty cycle of the PWM signal, the rotation speed of the fan can be accelerated or decelerated, such that the air speed of the fan is adjusted.

In the present embodiment, the control module generates the corresponding PWM control signal based on the received air speed adjustment control signal. The duty cycle of the PWM signal directly determines the conduction time length of the transistor switches in each loop to control the current flowing through the coils of the motor. Therefore, the rotation speed of the motor can be accurately adjusted by adjusting the duty cycle of the PWM signal.

In an embodiment, the portable fan further includes an energy recycling circuit, the energy recycling circuit is connected to the control module, the motor, and the energy storage unit. When the control module detects a decrease in the duty cycle of the PWM signal, the control module controls the energy recycling circuit to start operating. A reverse electromotive force generated when the motor decelerates is converted, by a rectifier circuit, into electrical energy to be stored in the energy storage unit. The energy recycling circuit includes the rectifier circuit, the energy storage unit, and a control switch. After receiving an energy recycling signal, the control switch is conducted, kinetic energy of the motor is converted, by the rectifier circuit, into electrical energy to be stored in a supercapacitor or a battery.

In an example, the portable fan is operating at a high speed. In this case, the user reduces the air speed or stops the fan through the input module. The control module detects the air speed adjustment signal or the switch signal and reduces the duty cycle of the PWM signal to slow down the motor. The control module generates the energy recycling signal to control the energy recycling circuit to start operating. The reverse electromotive force generated when the motor decelerates is converted, by the rectifier circuit, into the electrical energy to be stored in the supercapacitor or the battery. When the fan starts again, the control module detects a start signal and controls the energy storage unit to release the electrical energy to supply power to the motor, reducing consumption of an external power.

In the present embodiment, energy is recycled, the kinetic energy can be converted into the electrical energy to be stored when the fan decelerates or stops, reducing a waste of energy. Dependence on an external power supply is reduced, and endurance of the battery is extended, improving endurance of the portable fan. Air speed adjustment can be performed more stably and can be long-lasting, improving the usage experience.

In an embodiment, the input module 101 includes the voice module 112 and the touch control module 111. The voice module 112 and the touch control module 111 are connected to the control module 102. The voice module 112 and the touch control module 111 output the switch signal and the air speed adjustment control signal according to the instructions of the user. The control module 102 generates the switch control signal and the PWM control signal according to the switch signal and the air speed adjustment control signal.

In the present embodiment, the voice module and the touch control module operate cooperatively with each other, enabling the user to determine a most suitable operation method according to preference, improving the intelligence level of the product.

In an embodiment, the input module 101 includes the voice module 112 and the touch control module 111, the voice module 112 and the touch control module 111 are connected to the control module 102, the voice module 112 turns on or off the touch control module according to the instructions of the user and outputs the switch signal. The touch control module 111 outputs the air speed adjustment control signal, and the control module 102 generates the switch control signal and the PWM control signal according to the switch signal and the air speed adjustment control signal.

The user sends the voice instruction to the voice module 112 to turn on or turn off the touch control module. The voice module 112 transmits the instruction to the control module 102. The user sends the voice instruction to the voice module 112 to turn on or off the fan. The voice module 112 generates the switch signal according to the voice instruction of the user and transmits the switch signal to the control module 102. When the touch control module 111 is turned on, the user inputs an air speed adjustment instruction to the touch control module 111 via a touch operation (such as sliding or clicking). The touch control module 111 generates the air speed adjustment control signal based on the operation performed by the user and transmits the air speed adjustment control signal to the control module 102. The control module 102 turns on or off the touch control module 111 based on the voice instruction from the voice module 112. When the touch control module 111 is turned off, the air speed adjustment control signal is not generated base on any touch operation, such that misoperations can be avoided. After receiving the switch signal, the control module 102 generates the switch control signal to turn on or off the fan. After receiving the air speed adjustment control signal, the control module 102 calculates the corresponding duty cycle of the PWM signal and generates the PWM control signal to control the rotation speed of the motor.

In the present embodiment, the touch control module is turned on or off through the voice instruction. The user can turn off the touch control module by voice when holding the fan, avoiding the air speed from being adjusted caused by any accidental touch, improving the usage experience and safety performance of the fan. The switch signal generated by the voice module is processed by the control module to ensure the fan to be switched on or off accurately. When the touch control module is turned on, the air speed adjustment control signal is generated through the touch operation performed by the user. The control module generates the highly-precise PWM control signal based on the air speed adjustment control signal to precisely adjust the rotation speed of the fan to meet the demands of the user.

Figure 18:
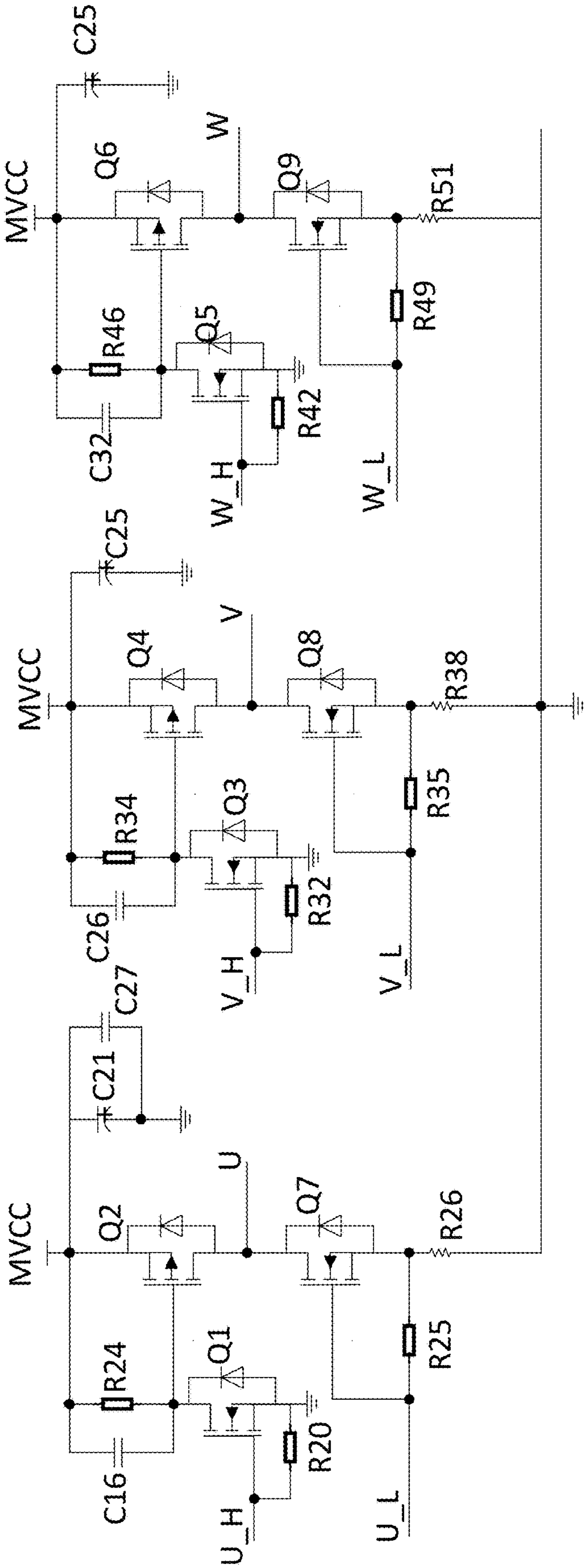
FIG. 18 is a circuit diagram of the drive module arranged in the portable fan configured with the high-speed three-phase motor according to an embodiment of the present disclosure.

In an example, as shown in FIG. 18, a circuit diagram of the drive module 103 is shown, and the drive module 103 includes a first drive submodule, a second drive submodule, and a third drive submodule.

The first drive submodule includes a MOS transistor Q1, a MOS transistor Q2, a MOS transistor Q7, a capacitor C16, a capacitor C21, a capacitor C27, a resistor R20, a resistor R24, a resistor R25, and a resistor R26. A first end of the capacitor C16, a first end of the resistor R24, a source of the MOS transistor Q2, a first end of the capacitor C21, and a first end of the capacitor C27 are connected to each other and further connected to a power supply. A second end of the capacitor C16 is connected to a second end of the resistor R24, a drain of the MOS transistor Q1, and a gate of the MOS transistor Q2. A gate of the MOS transistor Q1 is connected to a first end of the resistor R20 and a first control signal end U_H. A source of the MOS transistor Q1 and a second end of the resistor R20 are connected to each other and further grounded. A drain of the MOS transistor Q2 is connected to a drain of the MOS transistor Q7 and a first end of the first coil. A gate of the MOS transistor Q7 is connected to a first end of resistor R25 and a second control signal terminal U_L. A source of MOS tube Q7 is connected to a second end of resistor R25 and a first end of resistor R26. A second end of the capacitor C21 and a second terminal of the capacitor C27 are connected to each other and are further grounded.

The second drive submodule includes a MOS transistor Q3, a MOS transistor Q4, a MOS transistor Q8, a capacitor C26, a capacitor C25, a resistor R32, a resistor R34, a resistor R35, and a resistor R38. A first end of the capacitor C26, a first end of the resistor R34, a source of the MOS transistor Q4, and a first end of the capacitor C25 are connected to each other and are further connected to the power supply. A second end of the capacitor C26 is connected to a second end of the resistor R34, a drain of the MOS transistor Q3, and a gate of the MOS transistor Q4. A gate of the MOS transistor Q3 is connected to a first end of the resistor R32 and a third control signal end V_H. A source of the MOS transistor Q3 and a second end of the resistor R32 are connected to each other and are further grounded. A drain of the MOS transistor Q4 is connected to a drain of the MOS transistor Q8 and a first end of the second coil. A gate of the MOS transistor Q8 is connected to a first end of resistor R35 and a fourth control signal end V_L. A source of the MOS transistor Q8 is connected to a second end of the resistor R35 and a first end of the resistor R38. A second end of the capacitor C25 is grounded.

The third drive submodule includes a MOS transistor Q5, a MOS transistor Q6, a MOS transistor Q9, a capacitor C32, a capacitor C35, a resistor R42, a resistor R46, a resistor R49, and a resistor R51. A first end of capacitor C32, a first end of the resistor R46, a source of the MOS transistor Q6, and a first end of the capacitor C35 are connected to each other and are further connected to the power supply. A second end of the capacitor C32 is connected to a second end of the resistor R46, a drain of the MOS transistor Q5, and a gate of the MOS transistor Q6. A gate of the MOS transistor Q5 is connected to a first end of the resistor R42 and a fifth control signal end W_H. A source of the MOS transistor Q5 and a second end of the resistor R42 are connected to each other and are further grounded. A drain of the MOS transistor Q6 is connected to a drain of the MOS transistor Q9 and a first end of the third coil. A gate of the MOS transistor Q9 is connected to a first end of the resistor R49 and a sixth control signal end W_L. A source of the MOS transistor Q9 is connected to a second end of the resistor R49 and a first end of the resistor R51. A second end of the capacitor C25 is grounded. A second end of the resistor R26, a second end of the resistor R38, and a second end of the resistor R51 are connected to each other and are further grounded.

The power supply, the MOS transistor Q2, the first coil, the second coil, the MOS transistor Q8, and the resistor R38 cooperatively form a first loop. The power supply, the MOS transistor Q2, the first coil, the third coil, the MOS transistor Q9, and the resistor R51 cooperatively form a second loop. The power supply, the MOS transistor Q4, the second coil, the third coil, the MOS transistor Q9, and the resistor R51 cooperatively form a third loop. The power supply, the MOS transistor Q4, the second coil, the first coil, the MOS transistor Q7, and the resistor R26 cooperatively form a fourth loop. The power supply, the MOS transistor Q6, the third coil, the first coil, the MOS transistor Q7, and the resistor R26 cooperatively form a fifth loop. The fifth upper bridge arm transistor switch, the third coil, the second coil, the MOS transistor Q8, and the resistor R38 cooperatively form a sixth loop.

Each of the MOS transistor Q2, the MOS transistor Q4, and the MOS transistor Q6 may be a NMOS transistor or a PMOS transistor. A half-bridge driving method of the MOS transistor Q2, the MOS transistor Q4, and the MOS transistor Q6 may be driven by other driving methods in addition to the driving method in the circuit diagram. For example, a capacitor storage driving, a transformer coupling driving, an optical coupling driving, and so on, may be applied.

The control module 102 inputs the switch control signal to two transistor switches in each loop through a respective one control signal end of the first control signal end to the sixth control signal end. The control module 102 controls, through the switch control signal, the six loops to be conducted one by one according to a predetermined order, so as to drive the motor to start operating. The control module 102 inputs the PWM control signal to the two transistor switches in each loop through the respective control signal end of the first control signal end to the sixth control signal end. The control module 102 controls, based on the duty cycle of the PWM control signal, a conduction current of each loop to adjust the rotation speed of the motor.

Figure 19:
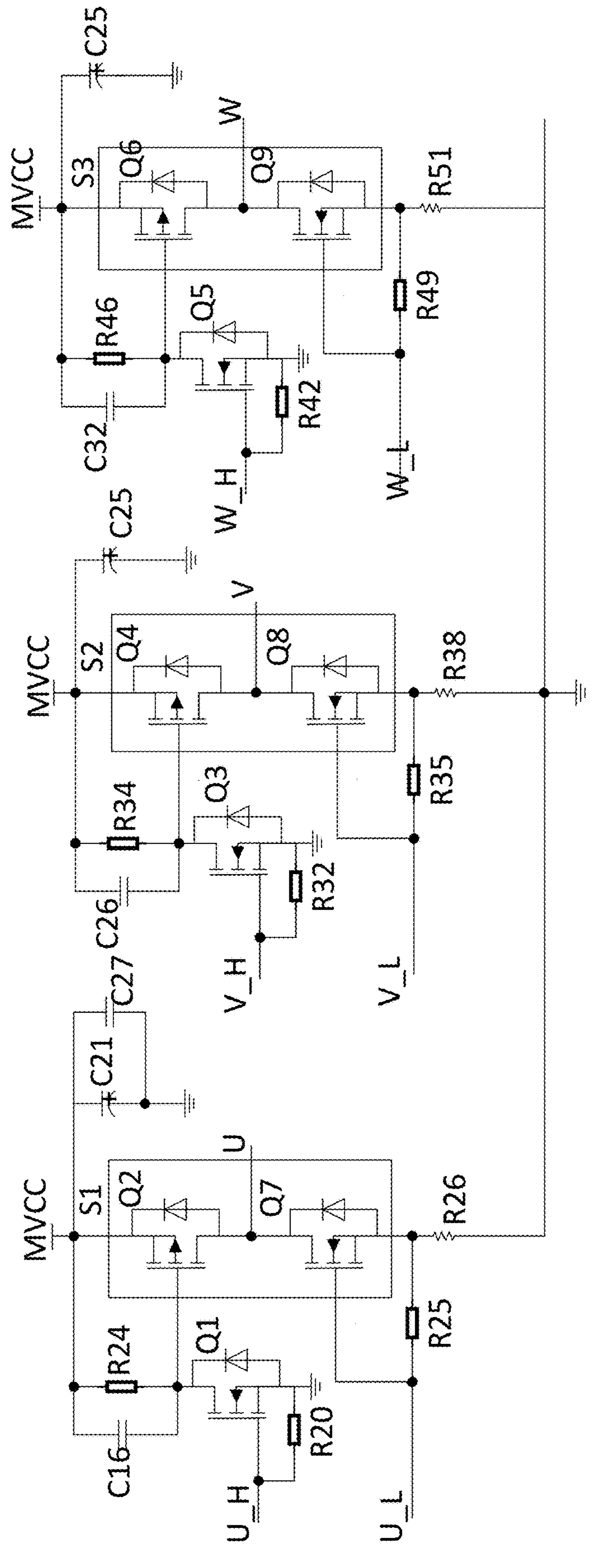
FIG. 19 is another circuit diagram of the drive module arranged in the portable fan configured with the high-speed three-phase motor according to an embodiment of the present disclosure.

In an embodiment, as shown in FIG. 19, two transistor switches of each bridge arm are integrated together. The MOS transistor Q2 and the MOS transistor Q7 are integrated into a chip S1. The MOS transistor Q4 and the MOS transistor Q8 are integrated into a chip S2. The MOS transistor Q6 and the MOS transistor Q9 are integrated into a chip S3. Integrating transistor switches can significantly reduce an occupation space on the circuit board, such that the drive circuit is more compact. Arranging an integrated transistor switch module simplifies design and a layout of the circuit, reducing wiring complexity.

Figure 20:
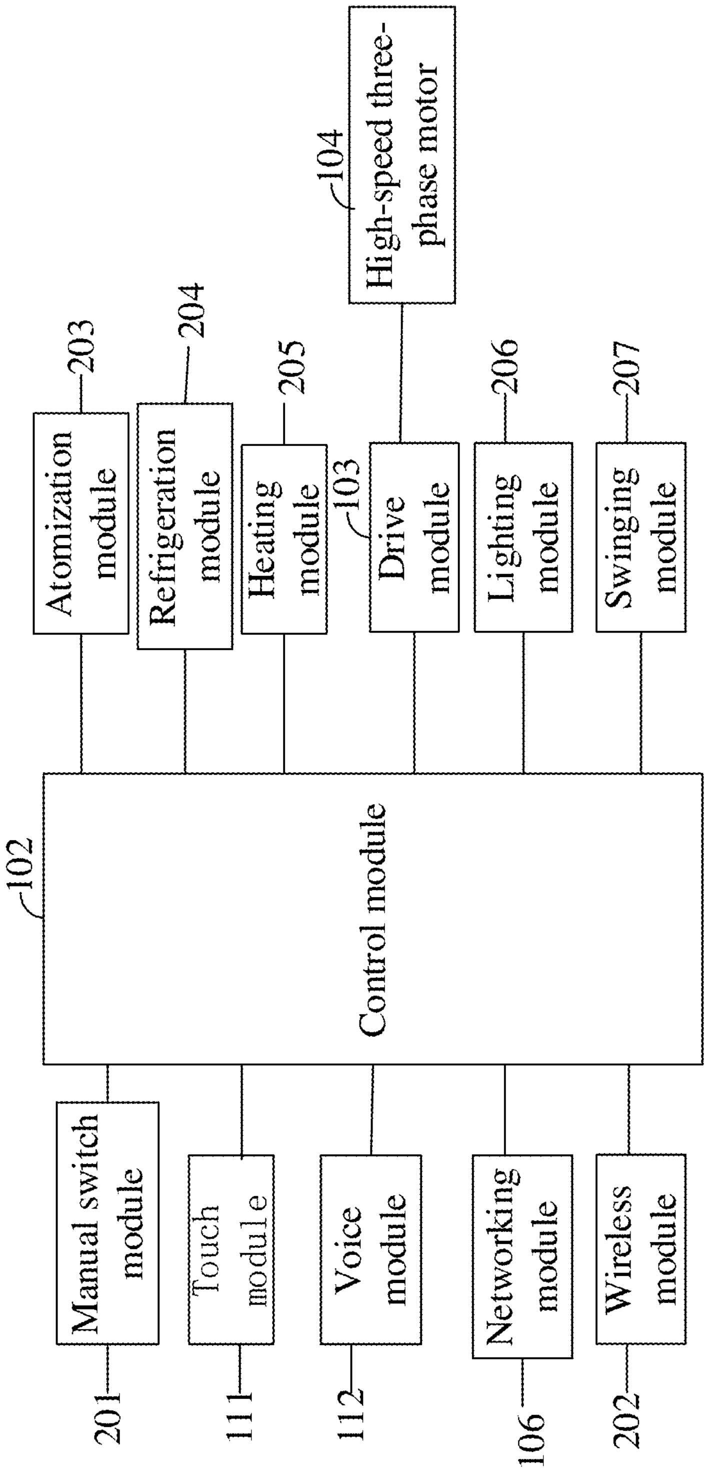
FIG. 20 is another structural schematic view of the portable fan configured with the high-speed three-phase motor according to an embodiment of the present disclosure.

In an embodiment, as shown in FIG. 20, the input module includes a manual switch module 201, the touch module 111, the voice module 112, the networking module 106, and a wireless module 202, all of which are connected to the control module 102. The portable fan further includes an atomization module 203, a refrigeration module 204, a heating module 205, a lighting module 206, and a singing module 207, all of which are connected to the control module 102.

The manual switch module 201 may be a key switch or an encoder. The touch control module 111 may be a touch button, a slide resistor, a touch-slide module, or a touch screen module. The wireless module 202 may be a mobile control module, a Bluetooth control module, and a wireless control module.

The key switch allows manual control of the fan to be achieved. By pressing the key, the fan can be turned on or off, i.e., speed adjustment. The encoder is configured to adjust the air speed. By rotating the encoder, setting of the air speed is changed. The touch button enables the fan to be turned on/off and enables the air speed to be adjusted by touch sensing. A resistance of the slide resistor can be adjusted by sliding to adjust the air speed, such that the air speed is adjusted continuously. The touch-slide module enables the air speed to be adjusted by a sliding gesture and by detecting the sliding parameters such as the sliding speed, the sliding direction and the sliding position. The touch screen module provides a graphical interface, various functions can be controlled by touching the screen, such as turning on/off the fan, the air speed adjustment, and timer setting. The voice control module enables the fan to be turned on and off and the air speed to be adjusted by the voice instruction, improving the usage experience of intelligent control. For the networking voice control module, the voice instruction is uploaded, through internet connection, to the cloud server to be processed, such that remote voice control is achieved. For the networking module, remote control functions can be achieved through the Internet, various functions of the fan can be controlled remotely by mobile phones or other devices. For the mobile control module, various functions, such as turning on/off the fan, the air speed adjustment, timing and so on, of the fan can be controlled through mobile devices (such as a mobile phone or a tablet computer). For the Bluetooth control module, the fan is connected to the mobile device through Bluetooth, such that the fan is wirelessly controlled in a short distance. For the wireless control module, the fan is controlled and managed remotely through wireless signals (such as Wi-Fi). The atomization module 203 can atomize water to enable the fan to blow out a cooler airflow. The refrigeration module 204 provides refrigeration, a refrigeration element arranged in the refrigeration module 204 reduces a temperature of air blown out of the fan, improving the cooling effect. The heating module 205 provides heating function, a heating element arranged in the heating module 205 enables the air blown from the fan to be warm, which is suitable for cold seasons. The lighting module 206 provides light and is integrated with a LED light or other light sources, providing light during nights and decorative lighting effects. The swinging module 207 enables the fan to swing one side to another side, increasing a coverage of the air and improving comfort.

In the present embodiment, the portable fan provides diversified control manners and intelligent functions and significantly improves the usage comfort experience, such that various needs under various scenarios are met.

It should be noted that all input, output and control functions in the portable fan can be integrated into one single chip or an integrated circuit. The integration can simplify design and manufacturing processes of a system, the number of components is reduced, space occupation is reduced, both manufacturing costs and power consumption are reduced.

According to the embodiment 1, the portable fan configured with the high-speed three-phase motor is provided and includes at least a hand-held fan, a desktop fan that is portable and can be placed on a desktop, and a neck fan to be worn on a neck of the user. Structures of the portable fan include, but not limited to, following embodiments.

Figure 21:
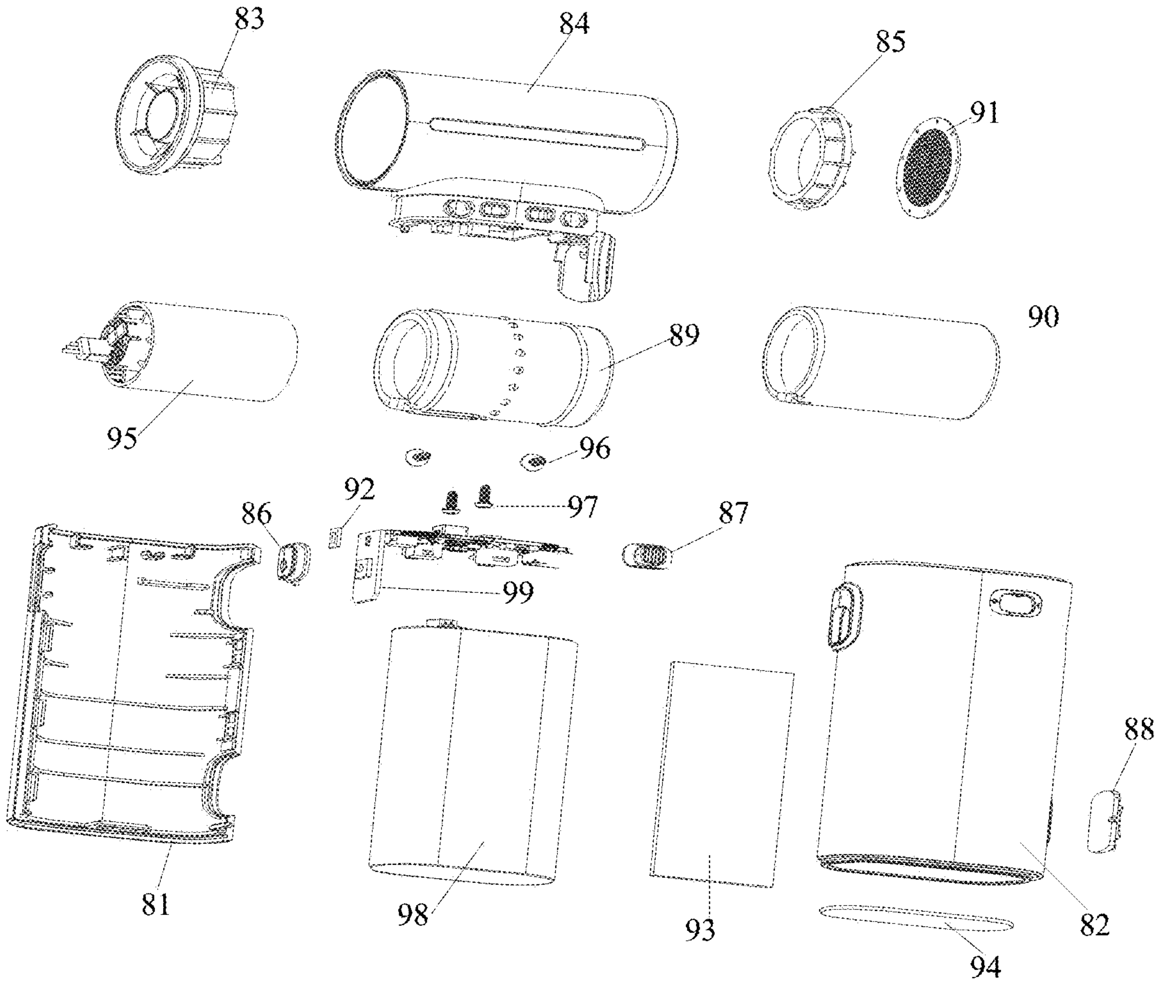
FIG. 21 is an exploded view of the portable fan configured with the high-speed three-phase motor according to an embodiment of the present disclosure.

In an embodiment, the portable fan configured with the high-speed three-phase motor is the hand-held fan to be held by hand. As shown in FIG. 21, an exploded view of the portable fan is shown, and the hand-held fan includes:

a handle left shell 81, a handle right shell 82, an air outlet front shell 83, a middle shell 84, an air outlet 85, a button 86, a toggling switch button 87, a wire slot 88, a vibration absorption silicone 89, a vibration absorption silicone 90, an air inlet mesh 91, a light-shielding foam 92, a battery foam 93, a silicone pad 94, a motor assembly 95, a screw 96, a screw 97, a battery 98, and a PCB 99.

Figure 22:
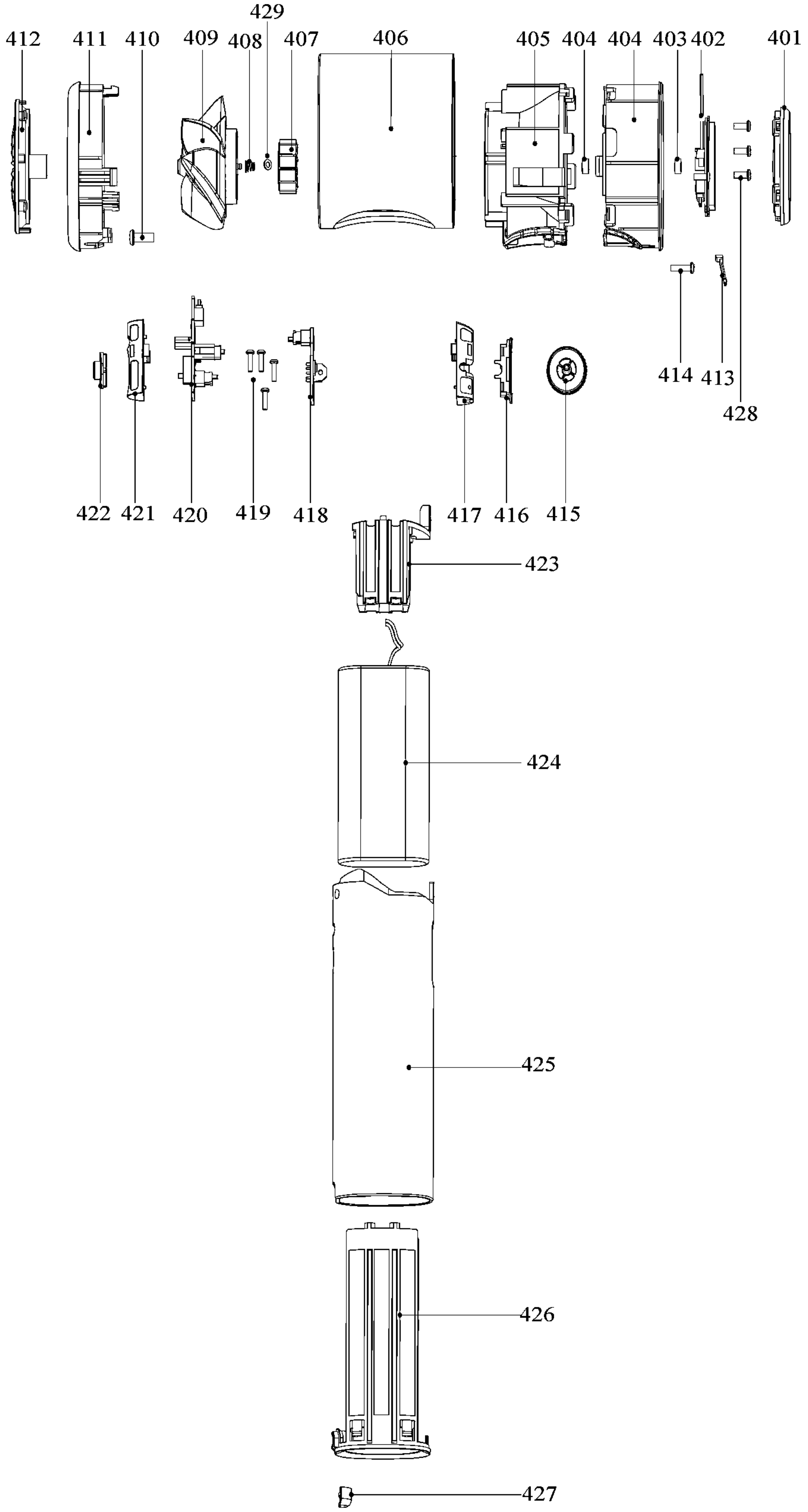
FIG. 22 is an exploded view of the portable fan configured with the high-speed three-phase motor according to another embodiment of the present disclosure.

In an embodiment, the portable fan configured with the high-speed three-phase motor is provided and is configured as a neck fan to be worn to the neck, as shown in FIG. 22, an exploded view of the portable fan is provided, the portable fan includes:

A front shell decorative member 401, a flat connection plate assembly 402, a ball bearing 403, a front shell 404, an air duct 405, a middle shell 406, a fan motor 407, a spring 408, fan blades 409, a screw 410, a rear shell 411, a rear shell decorative member 412, a screw cover 413, a screw 414, a roller assembly 415, a key decorative member 416, a mounting fixing bracket 417, a roller switch panel 418, a screw 419, a toggling switch panel 420, a motherboard fixing bracket 421, a toggling switch 422, a handle bracket 423, a battery pack 424, a handle 425, a handle decoration 426, a lanyard bracket 427, a screw 428, and a snap ring 429.

Figure 23:
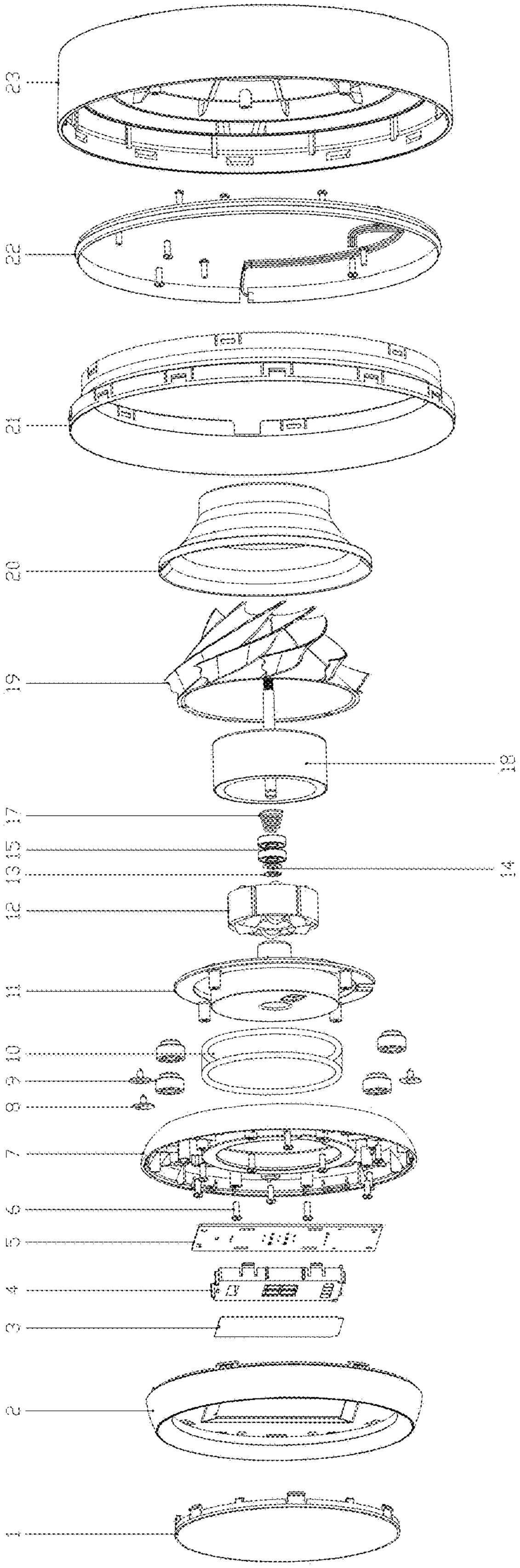
FIG. 23 is an exploded view of a first portion of the portable fan configured with the high-speed three-phase motor according to the another embodiment of the present disclosure.
Figure 24:
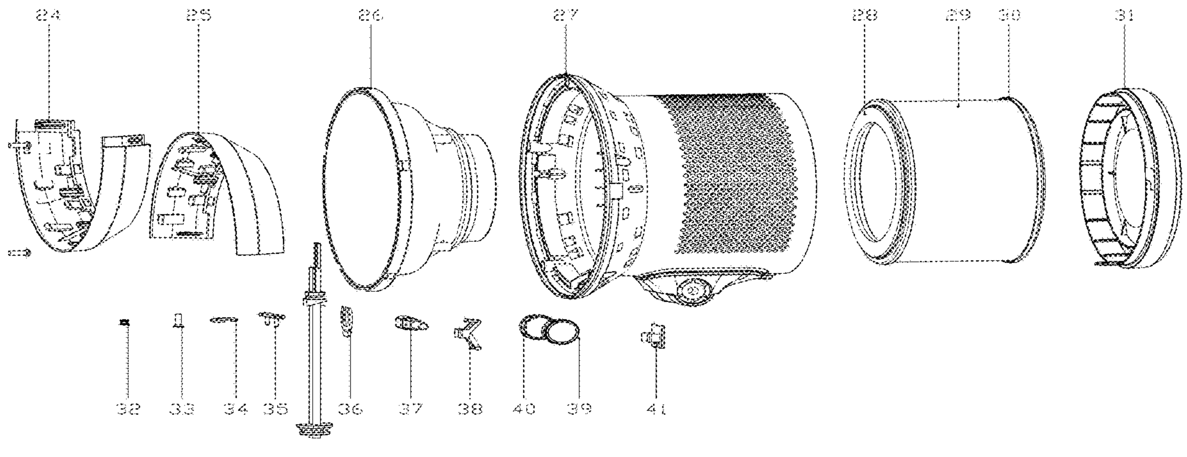
FIG. 24 is an exploded view of a second portion of the portable fan configured with the high-speed three-phase motor according to the another embodiment of the present disclosure.
Figure 25:
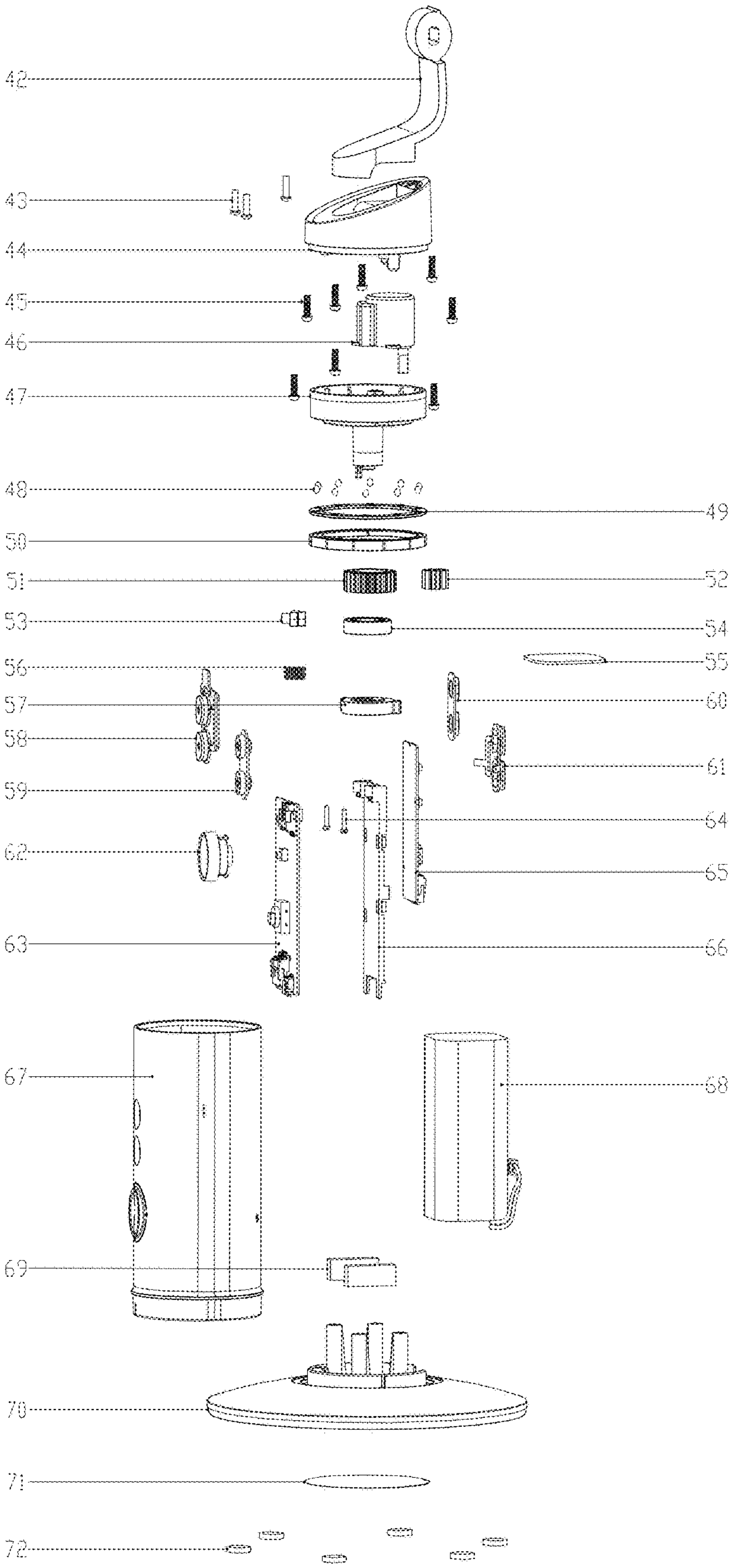
FIG. 25 is an exploded view of a third portion of the portable fan configured with the high-speed three-phase motor according to the another embodiment of the present disclosure.
Figure 28:
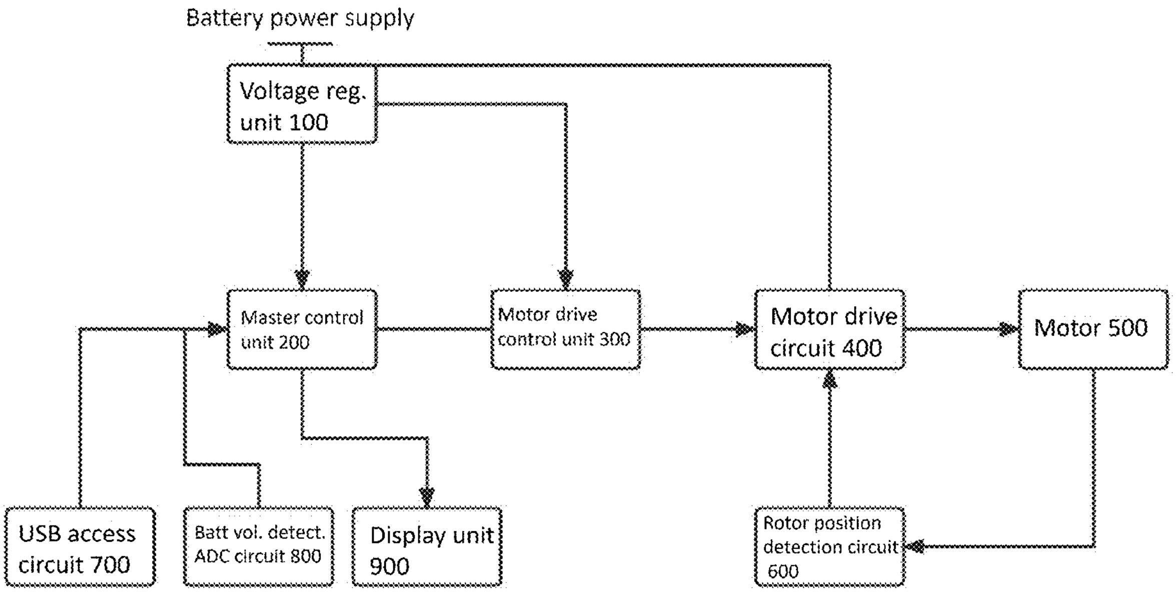
FIG. 28 is a circuit diagram of a motor drive control circuit of the portable fan according to an embodiment of the present disclosure.

In an embodiment, the portable fan configured with the high-speed three-phase motor is provided and is the desktop fan that is portable and can be placed on a desktop while in use. As shown in FIGS. 23 to 25, an exploded view of the portable fan is provided, the portable fan includes:

A screen shell 1, a screen front shell 2, a character translucent patch 3, a screen translucent bracket 4, a digital screen PCB 5, a self-tapping screw 6, a screen rear shell 7, a screw 8, a shock-absorbing silicon ring 9, a shock-absorbing EVA 10, a fan motor bracket 11, a motor 12, a snap ring 13, a pad 14, a fan bearing 15, a motherboard, a digital screen PCB connection wire 16, a fan spring 17, a magnetic ring assembly 18, fan blades 19, fan blade shell 20, a light guiding ring 21, a light strip 22, a fan head bracket 23, a lower screw hole cover 24, an upper screw hole cover 25, an air duct member 26, a shell 27, a filter end compression foam 28, an air filter 29, a filter bracket 30, a rear cover 31, a copper nut 32, a countersunk machine tooth screw 33, a shell wire snap ring 34, a wire cover 35, a base wire snap ring 36, a rotation shaft 37, an air-duct wire cover 38, a left rotation shaft plug 39, a right rotation shaft plug 40, a wire cover 41, an aluminum alloy bracket 42, a machine tooth screw 43, a base upper shell 44, a self-tapping screw 45, a stepping motor 46, a stepping motor bracket 47, a steel ball 48, a steel ball bracket 49, a steel ball lower bracket 50, a large gear 51, a small gear 52, a clutch gear 53, a stepping motor bearing 54, a battery EVA 55, a spring 56, a snap 57, a round button 58, a round button silicone 59, a light button silicone 60, a light button 61, a knob 62, a button board 63, a self-tapping screw 64, a charging board 65, a charging board bracket 66, a base lower shell 67, a battery pack 68, a battery EVA 69, a base bottom shell 70, a label 71, and a bottom pad 72.

In an embodiment, the present embodiment provides the portable fan configured with the high-speed three-phase motor, which can be used as a neck fan, as shown in FIG. 27, an exploded view of the portable fan is provided, the portable fan includes:

A neck brace 5, an air inlet 11, an air outlet 14, and a clamping arm 15.

Embodiment 2

The present embodiment provides a control method of the portable fan, as shown in FIG. 26, the control method includes the following.

In a step S101, the operating voltage of the high-speed three-phase motor is controlled to be in a range of 2 to 18 V, the operating current of the high-speed three-phase motor is controlled to be in a range of 0.1 to 10 A, and/or the rated operating power of the high-speed three-phase motor is controlled to be in a range of 0.5 to 100 W.

In a step S102, the drive module controls, based on the operating voltage, the operating current, and/or the rated operating power, the rated operating speed of the high-speed three-phase motor to reduce noise generated due to a high rotation speed and to control the air speed to be in a predetermined air speed range.

The control method further includes the following.

In a step S111, the air speed adjustment control signal is obtained.

In a step S112, the air speed adjustment control signal is converted into the PWM control signal.

In a step S113, the transistor switches of each bridge arm are controlled based on the PWM control signal to adjust the rotation speed of the motor.

The control method further includes the following.

In a step S201, the switch signal is obtained.

In a step S202, the switch signal is converted into the switch control signal.

In a step S203, the transistor switches of each bridge arm are controlled based on the switch control signal to drive the motor to start or stop operating.

The switch signal and the air speed adjustment control signal are control signals generated according to the user instruction. The touch signal and the adjustment signal generated by touches performed by the user or by other means can be directly converted into the switch control and the PWM control signal. The switch signal can be a switching operation performed by the user, such as an instruction of turning on or off the fan. The air speed adjustment control signal is configured to adjust the rotation speed of the fan and is usually generated by a manual operation of the user or by other control manners.

The switch signal is processed to be converted into the switch control signal to control the transistor switches of each bridge arm. The switch signal is configured to start or stop the operation of the motor. The air speed adjustment control signal is processed to calculate the duty cycle of the corresponding PWM control signal. The PWM control signal is configured to adjust the rotation speed of the motor. The rotation speed of the motor is controlled by adjusting the conduction time length of the transistor switches of each bridge arm.

The drive module turns, according to the switch control signal, on or off the transistor switches of each bridge arm, so as to start or stop the operation of the motor. In addition, the drive module adjusts, based on the calculated PWM control signal, an operating period and a duty cycle of each transistor switch of each bridge arm to control the rotation speed and the power output of the motor.

In an embodiment, the step of converting the air speed adjustment control signal into the PWM control signal when the input module is the touch control module, includes the following.

The duty cycle of the PWM signal is calculated based on the air speed adjustment control signal, and the PWM control signal is generated based on the duty cycle of the PWM signal.

In an embodiment, when the input module is the voice module, the voice module captures the voice signal of the user and converts the voice signal into the switch signal and the air speed adjustment control signal.

Details of the above two embodiments can be referred to the Embodiment 1 and will not be repeated herein.

Embodiment 3

Figure 29:
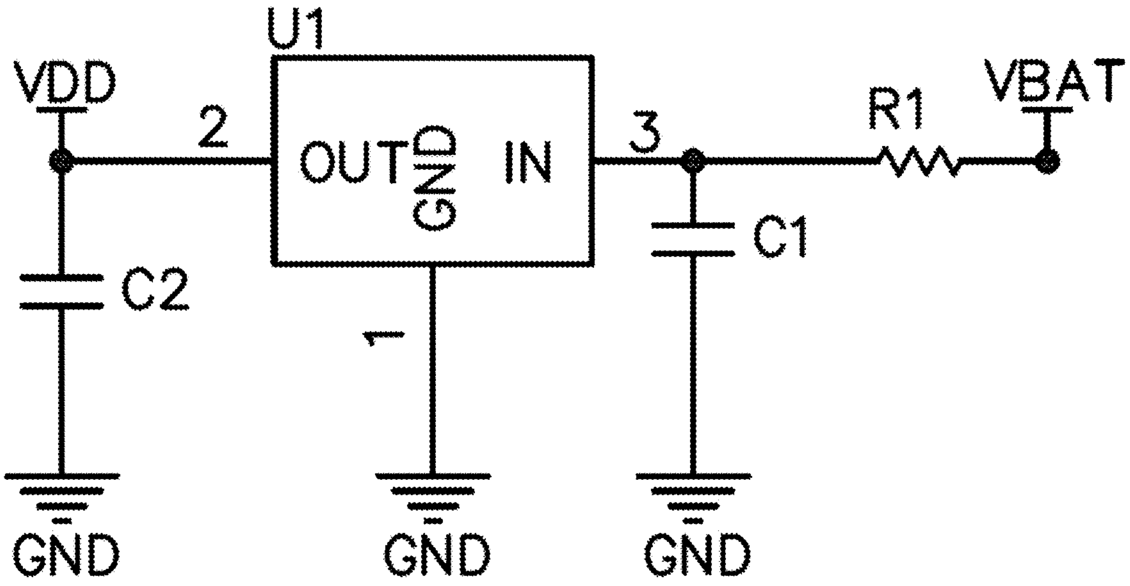
FIG. 29 is a circuit diagram of a voltage regulator according to an embodiment of the present disclosure.

As shown in FIG. 29:

The motor drive control circuit for the portable fan includes: a battery power supply, a voltage regulator unit 100, a master control unit 200, a motor drive control unit 300, a motor drive circuit 400, a motor 500, a rotor position detection circuit 600, a USB access circuit 700, an Analog-to-Digital Converter (ADC) power supply circuit 800, and a display unit 900.

The portable fan includes: the handheld fan, the neck fan, a wearable fan, a waist fan, the neck fan, a head-mounted fan, the desktop fan, a vehicle-mounted fan, and the like.

Figure 30:
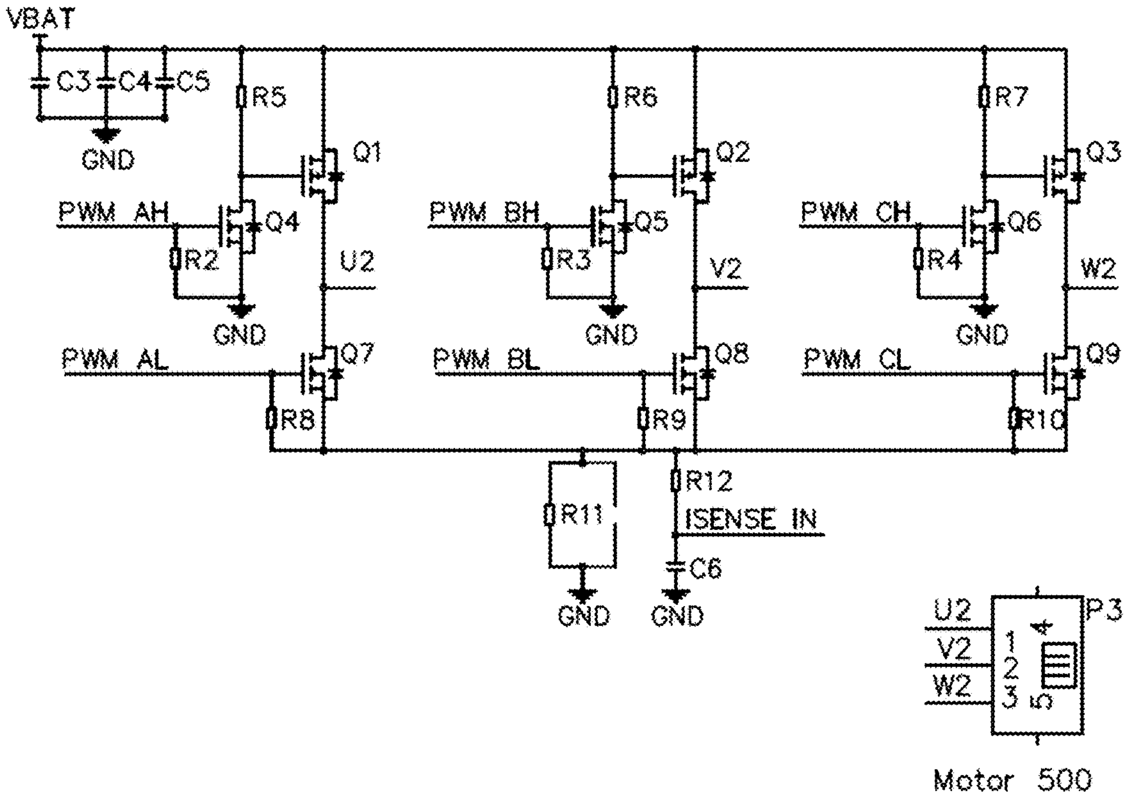
FIG. 30 is a circuit diagram showing an operating principle of the motor drive control circuit of the portable fan according to an embodiment of the present disclosure.

As shown in FIG. 30:

The voltage regulator unit 100 has a voltage regulator chip U1, and a power supply voltage VBAT is input, through a current limiting resistor R1, to an IN input pin of the voltage regulator chip U1. An end of the filter capacitor C1 is connected to an IN input pin 1 of the voltage regulator chip U1, and the other end of the filter capacitor C1 is grounded. An OUT output pin of the voltage regulator chip U1 outputs a VDD operating voltage to supply power to the master control chip U2 and the motor drive chip U3. The OUT output pin of the voltage regulator chip U1 is grounded through the capacitor C2, so as to filter the current. A GND pin of the voltage regulator chip U1 is grounded.

The voltage regulator unit 100 is configured to stabilize a power supply voltage and ensure that a constant voltage is output under various load conditions. The current can be automatically adjusted according to any change in the power supply voltage, such that the output voltage is constant. The voltage regulator unit 100 is configured to stabilize a voltage source having large variations, in order to prevent an influence caused by external environmental factors (such as temperature, humidity, and so on) on the circuit.

Figure 31:
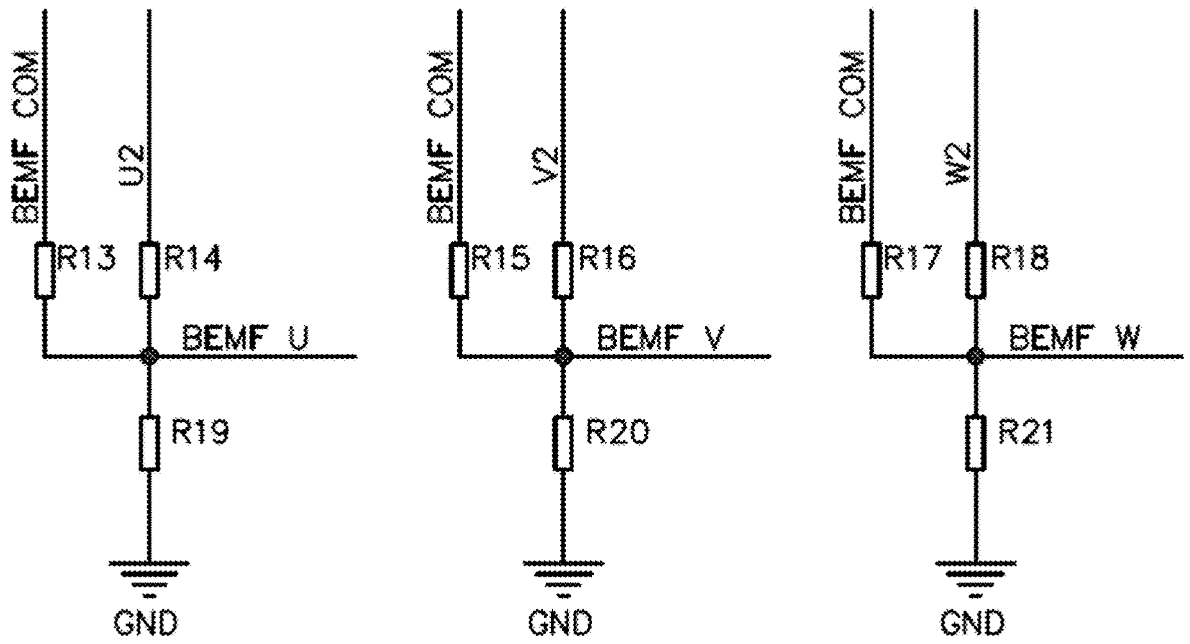
FIG. 31 is a circuit diagram showing an operating principle of a rotor position detection circuit of the portable fan according to an embodiment of the present disclosure.

As shown in FIG. 31:

In an embodiment, the motor drive control unit 300, the motor drive circuit 400, and the rotor position detection circuit 600 operate cooperatively to drive the motor 500 to operate.

A permanent magnet is arranged on a rotor of the motor 500, and three windings U2, V2, and W2 are connected to each other to form a Y shape and are arranged on a stator of the motor 500.

The motor drive control unit 300 outputs a control signal, and the motor drive circuit 400 controls, based on the control signal, magnitudes, flowing directions, and phase relationships of currents flowing through the three windings U2, V2, and W2 of the motor 500.

The motor drive circuit 400 includes: a capacitor C3, a capacitor C4, and a capacitor C5. The capacitor C3, the capacitor C4, and the capacitor C5 are connected to each other in parallel. An end of the in-parallel connected capacitors is connected to the power supply voltage VBAT, and the other end of the in-parallel connected capacitors is grounded, so as to filter the current and stabilize the voltage.

In an embodiment, the motor drive circuit 400 further includes: the MOS transistor switch Q1. An end of the MOS transistor switch Q1 is connected to the power supply voltage VBAT, and the other end of the MOS transistor switch Q1 is connected to the winding U2. Conductivity of the MOS transistor switch Q1 is controlled by the MOS transistor switch Q4. An end of the MOS transistor switch Q4 is connected, through a voltage-divider current-limiting resistor R5, to the power supply voltage VBAT, and the other end of the MOS transistor switch Q4 is grounded. The motor drive control unit 300 outputs a PWM_AH signal to a drain of the MOS transistor switch Q4 to control the MOS transistor switch Q4 to be conducted. An end of the MOS transistor switch Q7 is connected to the winding U2, and the other end of the MOS transistor switch Q7 is grounded through a resistor R11. The motor drive control unit 300 outputs a PWM_AL signal to a drain of MOS transistor switch Q7 to control conductivity of the MOS transistor switch Q7. Each of the MOS transistor switch Q1, the MOS transistor switch Q4, the MOS transistor switch Q7 is arranged with a reversed diode. The reversed diode can be reverse broken before an overvoltage causes any damage to the MOS transistor switches, preventing the MOS transistor switches from being burned.

In some embodiments, the MOS transistor switch Q1 is a P-type MOS transistor switch, and each of the MOS transistor switch Q4 and the MOS transistor switch Q7 is an N-type MOS transistor switch. The resistor R2 is connected to a drain and a source of the MOS transistor switch Q4. A resistor R8 is connected to a drain and a source of the MOS transistor switch Q7. In this way, a bias voltage is provided for the field effect tube. In addition, static electricity between the gate and the source of the MOS transistor switch can be discharged, such that the MOS transistor switch is protected.

A current control principle of the winding U2 is as follows.

The current flows into the winding U2 as follows. The motor drive control unit 300 outputs a PWM_AL low-level signal to the drain of MOS transistor switch Q7, and the MOS transistor switch Q7 is cut off. The motor drive control unit 300 outputs a PWM_AH signal to the drain of the MOS transistor switch Q4, and the MOS transistor switch Q4 is conducted. The power supply voltage VBAT is grounded through the voltage-divider current-limiting resistor R5. The drain of the MOS transistor switch Q1 is grounded to receive the low level signal, and the MOS transistor switch Q1 is conducted, and the current flows into the winding U2.

A current flows out of the winding U2 as follows. The motor drive control unit 300 outputs the PWM_AH low level signal to the drain of the MOS transistor switch Q4, the MOS transistor switch Q4 is cut off. The drain of the MOS transistor switch Q1 is connected to a high level signal, the MOS transistor switch Q1 is disconnected. The motor drive control unit 300 outputs the PWM_AL signal to the drain of the MOS transistor switch Q7, the MOS transistor switch Q7 is conducted, and the current flows out of the winding U2.

In an embodiment, the MOS transistor switches Q2, Q5, and Q8 and the resistors R6, R3, and R9 cooperatively form a MOS transistor switch circuit to control the current to flowing into and out of the winding V2. A circuit structure and a control principle thereof are similar to that of the current control circuit for the winding U2. The MOS transistor switches Q3, Q6, and Q9 and the resistors R7, R4, and R10 cooperatively form a MOS transistor switch circuit to the current to flow into and out of the winding W2. A circuit structure and a control principle thereof are similar to that of the current control circuit for the winding U2.

In an embodiment, a motor overcurrent protection circuit includes: a current sampling resistor R11, configured to monitor a current flowing out of the motor 500. A voltage of the resistor R11 is output, through the current limiting resistor R12, to an ISENSE_IN overcurrent protection detection pin of the motor drive control unit 300. The motor drive control unit 300 converts an input voltage signal into a corresponding digital signal to obtain a quantized current value of the motor 500. An end of the capacitor C6 is connected to the ISENSE_IN overcurrent protection detection pin of the motor drive control unit 300, and the other end of the capacitor C6 is grounded, so as to filter the current and stabilize the voltage. When the current value of the motor 500 exceeds a maximum operating current, the motor drive control unit 300 adjusts the control signal outputted to the motor drive circuit 400 to reduce the current flowing through the winding U2, the winding V2, and the winding W2 of the motor 500.

Figure 32:
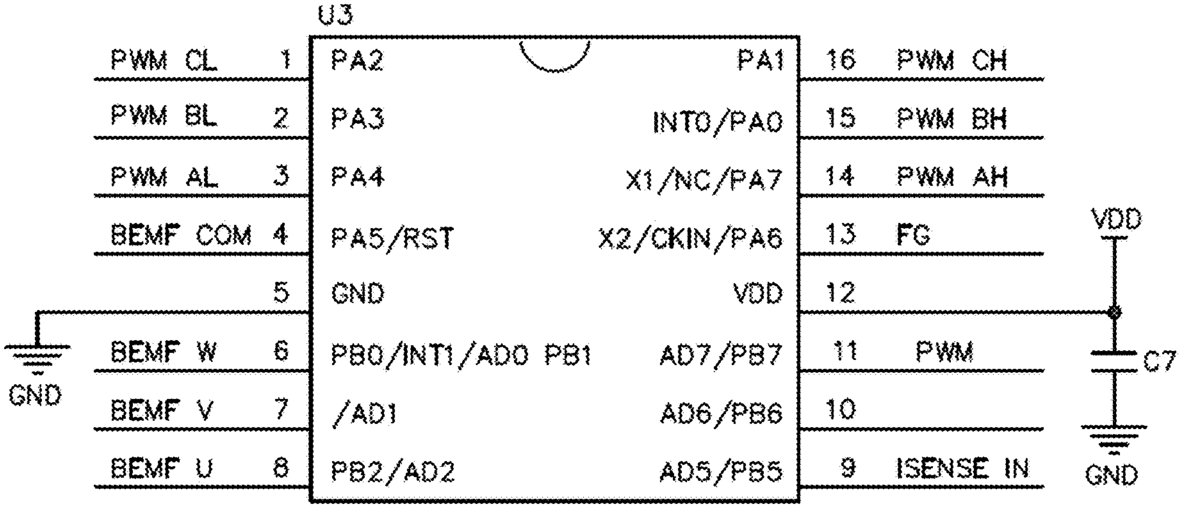
FIG. 32 is a circuit diagram of a motor drive control unit according to an embodiment of the present disclosure.

As shown in FIG. 32:

In an embodiment, in the rotor position detection circuit 600, an end of the resistor R13 is connected to a BEMF_COM pin of the motor drive control unit 300, and the other end is grounded through the resistor R19. The winding U2 is connected, through the resistor R14, to the BEMF_U pin of the motor drive control unit 300, and the other end of the resistor R14 is grounded through the resistor R19.

The resistor R15, the resistor R16, the resistor R20 cooperatively form a BEMF counter-electromotive force output circuit to output a BEMF counter-electromotive force voltage signal of the winding V2. A circuit structure and a control principle are similar to that of the BEMF counter-electromotive force output circuit of the winding U2. The resistor R17, the resistor R18, the resistor R21 cooperatively form a BEMF counter-electromotive force output circuit to output a BEMF counter-electromotive force voltage signal of the winding W2. A circuit structure and a control principle are similar to that of the BEMF counter-electromotive force output circuit of the winding U2.

The motor drive control unit 300 monitors the line voltages of the windings U2, V2, and W2 via signals input from the BEMF_U pin, the BEMF_V pin, and the BEMF_W pin and calculates a counter electromotive force of the rotor of the motor 500, such that a position of the rotor of the motor 500 can be calculated.

A drive control principle of the motor 500 is as follows.

The master control unit 200 outputs a motor start signal to an input end of the motor drive control unit 300. The motor drive control unit 300 outputs a motor drive signal to the gate of the MOS transistor of the motor drive circuit 400. The motor drive control unit 300 obtains the current position of the rotor of the motor 500 through the counter-electromotive force and controls a phase relationship of outputs of all phases. Windings of two phases are supplied with power at one time point, and power supply time of the two phases has an electrical angle of 120 degrees. In this way, a certain angle is formed between a direction of a stator magnetic chain and a direction of a rotor magnetic chain, so as to drive the rotor of the motor 500 to rotate.

Figure 33:
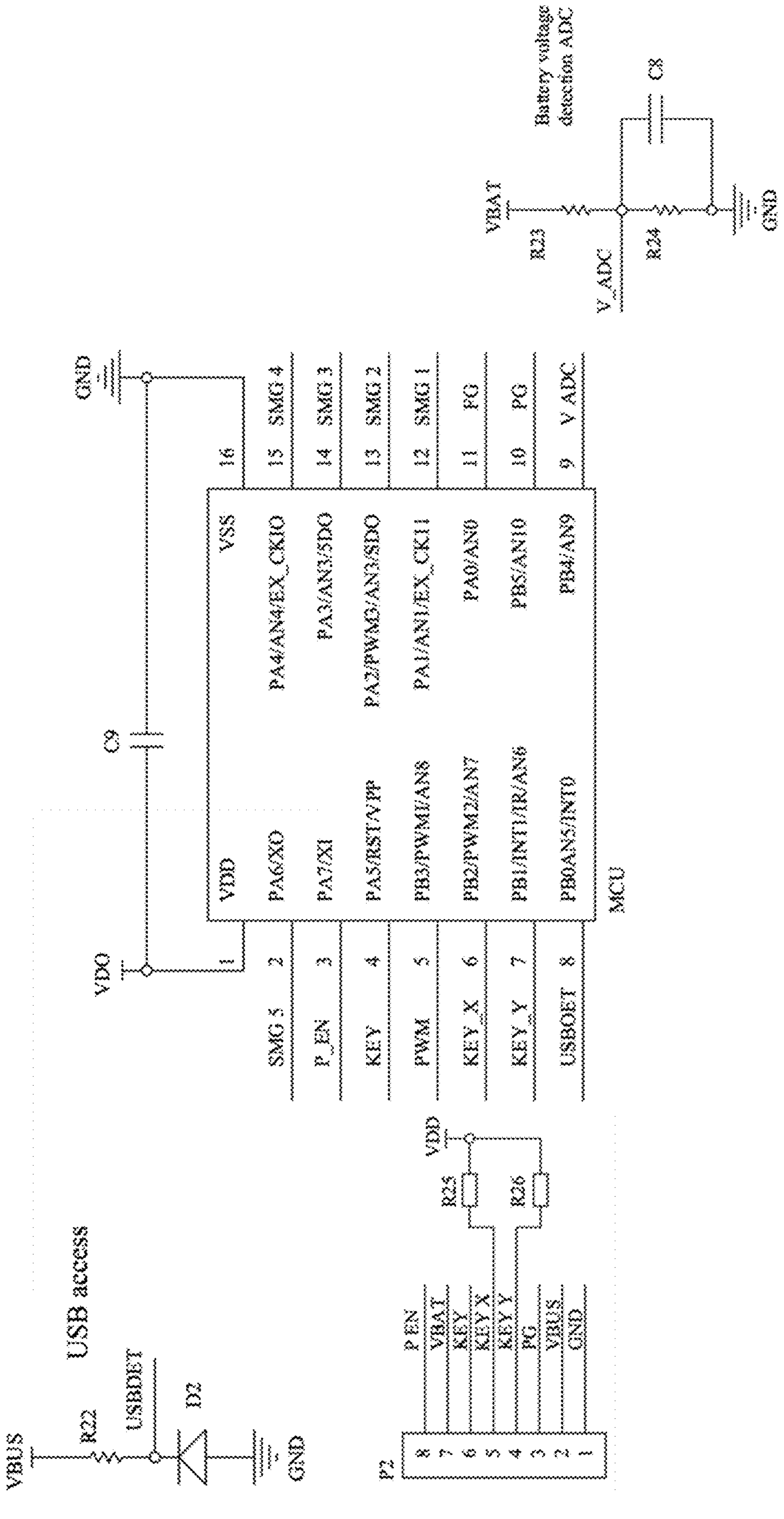
FIG. 33 is a circuit diagram showing an operating principle of a master control unit according to an embodiment of the present disclosure.

As shown in FIG. 33:

In an embodiment, the motor drive control unit 300 includes the motor drive chip U3, the VDD power supply pin 12 of the motor drive chip U3 is connected to the VDD operating voltage, and the capacitor C7 is connected to the VDD power supply pin 12 of the motor drive chip U3 to filter the current and stabilize the voltage. A GND pin 5 of the motor drive chip U3 is connected to the ground. A PWM pin 11 of the motor drive chip U3 receives a motor operating PWM signal. Pins 1-3 and 14-16 of motor driver chip U3 output the motor drive signal to the gate of the MOS transistor of the motor drive circuit 400. Pins 6-8 of the motor driver chip U3 receive the counter-electromotive force signals BEMF_U, BEMF_V, and BEMF_W. An FG pin 13 of the motor drive chip U3 outputs motor rotation speed information. The ISENSE_IN pin 9 of the motor driver chip U3 receives the overcurrent protection signal.

Figure 34:
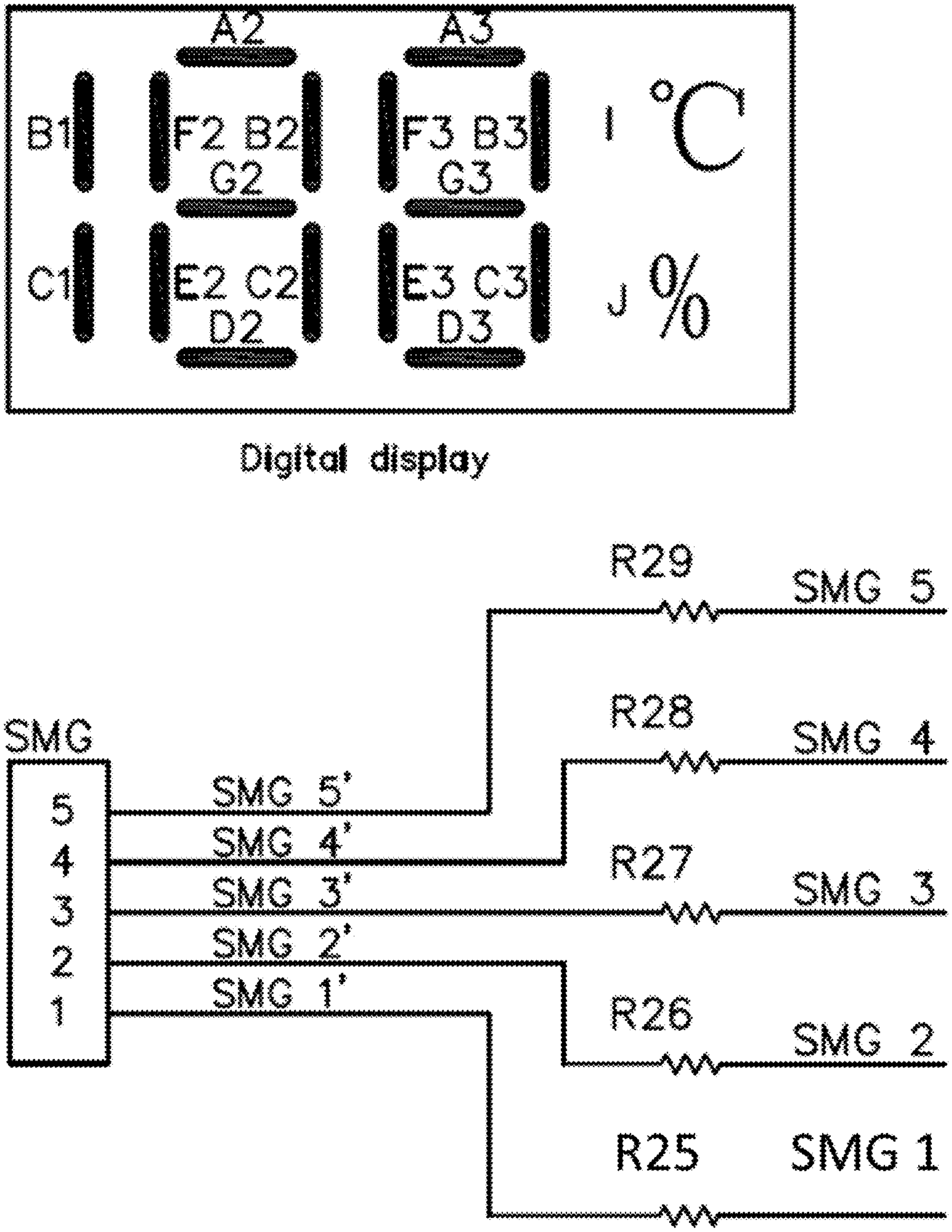
FIG. 34 is a circuit diagram showing an operating principle of a displaying unit according to an embodiment of the present disclosure.

As shown in FIG. 34:

In an embodiment, for the USB access circuit 700, a USB voltage VBUS outputs a USBDET signal through a current limiting resistor R22. A positive electrode of the diode D2 is grounded, and a negative electrode of the diode D2 is connected, through the resistor R22, to the USB voltage VBUS, to achieve overvoltage protection of the master control unit.

In an embodiment, for the battery voltage detection ADC circuit 800, the battery voltage VBAT is grounded through a resistor R23 and a resistor R24, and the capacitor C8 is connected in parallel with the resistor R24. An end of the resistor R24 outputs an ADC voltage signal V_ADC.

In an embodiment, the motor drive control circuit of the portable fan is arranged with a transfer interface P2, the transfer interface P2 transmits a P_EN enable signal of a dip switch and gear adjustment signals KEY, KEY_X, and KEY_Y to the master control unit 200 of the portable fan. The VDD power supply is supplied to a mode switching roller through a current limiting resistor R25 and a current limiting resistor R26.

In an embodiment, the display unit 900 includes: an SMG switch interface, a digital display. SMG switch adapter interface pins 1-5 are connected to the master control unit 200 via the current limiting resistors R25-R29 to receive a display control signal and transmits the display control signal to the digital display. The digital display displays an air blowing temperature of the portable fan and a battery power level of the fan based on the display control signal.

In an embodiment, the master control unit 200 includes a control chip U4. A VDD power supply pin 1 of the control chip U4 is connected to the VDD operating voltage. The VDD power supply pin 1 of the control chip U4 is grounded through the voltage regulator capacitor C9. A VSS pin 16 of the control chip U4 is grounded. Pins 4, 6, and 7 of the control chip U4 receive the gear signals KEY, KEY_X, KEY_Y and send a fan operation state instruction. A pin 5 of the control chip U4 outputs the motor operation PWM signal to the motor drive chip U3. A pin 8 of the control chip U4 receives a USBDET signal to determine a power supply state. A pin 9 of the control chip U4 receives the ADC voltage signal V_ADC; pins 2 and 12-15 of the control chip U4 are connected to the display unit 900 to output the display control signal.

The above embodiments are only used to illustrate the technical solutions of the present disclosure, but do not to limit the present disclosure. Although the present disclosure is described in detail by referring to the foregoing embodiments, any ordinary skilled person in the art shall understand that modifications and equivalent replacements can be made to the technical solutions. The modifications or replacements do not cause the technical solutions to deviate from the spirit and the scope of the present disclosure and shall be included within the scope of the present disclosure.

What is claimed is:

1. A portable fan configured with a high-speed three-phase motor, the portable fan comprising: a control module, a drive module, and the high-speed three-phase motor, wherein the high-speed three-phase motor has an operating voltage of 2V to 18 V and an operating current of 0.1 to 10 A, and has a rated operating power of 0.5 to 100 W;

the control module is configured to control, via the drive module and based on the operating voltage, the operating current, and/or the rated operating power, a rated operating rotation speed of the high-speed three-phase motor to reduce noise generated due to a high rotation speed of the high-speed three-phase motor and to control an air speed to be within a preset air speed range;

wherein, the portable fan further comprises an input module, wherein the input module is connected to the control module, the drive module comprises a first bridge arm, a second bridge arm, and a third bridge arm; each of the first bridge arm, the second bridge arm, and the third bridge arm comprises: an upper bridge arm transistor switch located at a side of a center point of the bridge arm; and a lower bridge arm transistor switch located at the other side of the center point of the bridge arm; the center point of each of the first bridge arm, the second bridge arm, and the third bridge arm is connected to a coil of one phase of the high-speed three-phase motor;

the input module is configured to output an air speed adjustment control signal according to a user instruction, the control module is configured to generate a PWM control signal according to the air speed adjustment control signal and control, based on the PWM control signal, each transistor switch of each of the first bridge arm, the second bridge arm, and the third bridge arm to adjust the rotation speed of the high-speed three-phase motor; and/or the input module is configured to output a switch signal according to the user instruction; the control module is configured to generate a switch control signal according to the switch signal and control, through the switch control signal, each transistor switch of each of the first bridge arm, the second bridge arm, and the third bridge arm to drive the high-speed three-phase motor to start operating or stop operating;

wherein the first bridge arm comprises a first upper bridge arm transistor switch and a second lower bridge arm transistor switch; the second bridge arm comprises a third upper bridge arm transistor switch and a fourth lower bridge arm transistor switch; the third bridge arm comprises a fifth upper bridge arm transistor switch and a sixth lower bridge arm transistor switch; a center point of the first bridge arm is connected to a first coil, a center point of the second bridge arm is connected to a second coil, a center point of the third bridge arm is connected to a third coil;

the first upper bridge arm transistor switch, the first coil, the second coil, and the fourth lower bridge arm transistor switch cooperatively form a first loop; the first upper bridge arm transistor switch, the first coil, the third coil, and the sixth lower bridge arm transistor switch cooperatively form a second loop; the third upper bridge arm transistor switch, the second coil, the third coil, and the sixth lower bridge arm transistor switch cooperatively form a third loop; the third upper bridge arm transistor switch, the second coil, the first coil, and the second lower bridge arm transistor switch cooperatively form a fourth loop; the fifth upper bridge arm transistor switch, the third coil, the first coil, and the second lower bridge arm transistor switch cooperatively form a fifth loop; the fifth upper bridge arm transistor switch, the third coil, the second coil, and the fourth lower bridge arm transistor switch cooperatively form a sixth loop:

the control module controls, through the switch control signal, the first loop, the second loop, the third loop, the fourth loop, the fifth loop, and the sixth loop to be conducted one by one in a preset order to drive the motor to start operating; the control module controls, through the PWM control signal, a conduction time length of each transistor switch in each of the first loop, the second loop, the third loop, the fourth loop, the fifth loop, and the sixth loop to adjust the rotation speed of the motor.

2. The portable fan according to claim 1, wherein when the high-speed three-phase motor has the operating voltage of 6V to 8.4 V, the operating current of 0.12 A to 1 A, and/or the rated operating power of 0.8W to 9 W, the control module controls, based on the operating voltage, the operating current, and/or the rated operating power and through the drive module, the high-speed three-phase motor to have the rated operating rotation speed of 6000 to 15000 RPM; or when the operating voltage of the high-speed three-phase motor is in a range of 5.9V to 8.4 V, the operating current of the high-speed three-phase motor is in a range 0.5 A to 6 A, and/or the rated operating power of the high-speed three-phase motor is in a range 5 W to 50 W, the control module controls, based on the operating voltage, the operating current, and/or the rated operating power and through the drive module, the rated operating rotation speed of the high-speed three-phase motor to be in a range of 20,000 to 80,000 RPM; or when the operating voltage of the high-speed three-phase motor is in a range of 2V to 5.8 V, the operating current of the high-speed three-phase motor is in a range 0.25 A to 2 A, and/or the rated operating power of the high-speed three-phase motor is in a range 1 W to 8 W, the control module controls, based on the operating voltage, the operating current, and/or the rated operating power and through the drive module, the rated operating rotation speed of the high-speed three-phase motor to be in a range of 15000 to 41000 RPM; or when the operating voltage of the high-speed three-phase motor is in a range of 8.5V to 12.6 V, the operating current of the high-speed three-phase motor is in a range 0.5 A to 5 A, and/or the rated operating power of the high-speed three-phase motor is in a range 6 W to 60 W, the control module controls, based on the operating voltage, the operating current, and/or the rated operating power and through the drive module, the rated operating rotation speed of the high-speed three-phase motor to be in a range of 25000 to 85000 RPM; or when the operating voltage of the high-speed three-phase motor is in a range of 12V to 18 V, the operating current of the high-speed three-phase motor is in a range 0.1 A to 1 A, and/or the rated operating power of the high-speed three-phase motor is in a range 2 W to 16 W, the control module controls, based on the operating voltage, the operating current, and/or the rated operating power and through the drive module, the rated operating rotation speed of the high-speed three-phase motor to be in a range of 2000 to 6000 RPM; or when the operating voltage of the high-speed three-phase motor is in a range of 3.7V to 4.3 V, the operating current of the high-speed three-phase motor is in a range 0.25 A to 2 A, and/or the rated operating power of the high-speed three-phase motor is in a range 1 W to 8 W, the control module controls, based on the operating voltage, the operating current, and/or the rated operating power and through the drive module, the rated operating rotation speed of the high-speed three-phase motor to be in a range of 15000 to 41000 RPM; or the air speed is controlled to reach 10 to 100 speed values.

3. The portable fan according to claim 1, wherein when the input module is a touch module, the touch module is configured to output the switch signal when detecting a touch action, and the control module is configured to generate the switch control signal according to the switch signal;

the touch module is configured to output the air speed adjustment signal when detecting a sliding parameter, and the control module is configured to calculate a duty cycle of a PWM signal according to the air speed adjustment signal and generate the PWM control signal according to the duty cycle of the PWM signal;

or when the input module is a voice module, the input module is configured to capture a voice signal of a user and convert the voice signal into the switch signal and the air speed adjustment control signal.

4. The portable fan according to claim 3, wherein the touch control module is a touch-slide adjustment chip comprising a plurality of contacts; the touch-slide adjustment chip is configured to generate the switch signal when the plurality of contacts detecting the touch action and to generate the air speed adjustment control signal when the plurality of contacts detecting the sliding parameter; or the touch control module is a touch screen chip comprising a switch region and a sliding region, the touch screen chip generates the switch signal when detecting the touch action in the switch region and generates the air speed adjusting control signal when detecting the sliding parameter in the sliding region; or the touch control module comprises a plurality of single-contact touch chips, the touch control module is configured to generate the switch signal when detecting the touch action by any single touch of the plurality of single-contact touch chips and to generate the air speed adjustment control signal when detecting the sliding parameter by a plurality of contacts of the plurality of single-contact touch chips; or the voice module comprises a voice capture module, a voice recognition module, and a voice output module, the voice recognition module is connected to the voice capture module, the voice output module, and the control module; the voice module is configured to capture the voice signal of the user, the voice recognition module is configured to convert the voice signal into the switch signal and the air speed adjustment control signal and send the switch signal and the air speed adjustment control signal to the control module; the voice recognition module is configured to control the voice output module to output or not output an execution result according to a feedback from the control module; or the portable fan further comprises a networking module, the connected to the voice module and the control module; the voice module is configured to upload the voice signal to a cloud server via the networking module, the cloud server is configured to convert the voice signal into the switch signal and the air speed adjustment control signal and output the switch signal and the air speed adjustment control signal to the networking module, the networking module is configured to send the switch signal and the air speed adjustment control signal to the control module.

5. The portable fan according to claim 1, wherein the portable fan comprises at least: a handheld fan to be used by being held in a hand, a desktop fan that is portable and is used by standing on a desktop, or a neck fan worn to a neck of a user; and the portable fan is arranged with a battery to supply power to the high-speed three-phase motor when the portable fan is being carried by a user.

6. The portable fan according to claim 1, wherein when the control module detecting a change in the operating voltage, the control module is configured to maintain the operating voltage within a constant voltage range by boosting or bucking the operating voltage; or when the control module detecting a change in the operating current, the control module is configured to maintain the operating current within a constant current range by adjusting a PWM control signal; or when the control module detecting a change in the operating power, the control module is configured to stabilize the operating power by adjusting the operating voltage or the operating current; or the portable fan further comprises a rotation speed measurement module, connected to the high-speed three-phase motor and the control module; and the rotation speed measurement module is configured to measure an actual rotation speed of the motor and send the actual rotation speed to the control module; the control module obtains a rotation-speed change amount based on the actual rotation speed and a target rotation speed, adjusts a duty cycle of a PWM signal according to the rotation-speed change amount, and outputs an adjusted PWM control signal to the drive module.

7. The portable fan according to claim 1, wherein the input module and the control module are connected to each other by in a wired or wireless manner, the input module is arranged on a shell of the portable fan or on another electronic device; or the input module comprises a manual switch module, a touch module, a voice module, a networking module, and a wireless module, all of which are connected to the control module; the portable fan further comprises an atomization module, a refrigeration module, a heating module, a lighting module, and a swinging module connected to the control module.

8. A control method of the portable fan according to claim 1, wherein the portable fan comprises at least: a handheld fan to be used by being held in a hand, a desktop fan that is portable and is used by standing on a desktop, or a neck fan worn to a neck of a user; and the method comprising:

controlling the operating voltage of the high-speed three-phase motor to be in a range of 2 to 18 V, controlling the operating current of the high-speed three-phase motor to be in a range of 0.1 to 10 A, and controlling the rated operating power of the high-speed three-phase motor to be in a range of 0.5 to 100 W; and controlling, by the drive module based on the operating voltage, the operating current, and/or the rated operating power, the rated operating rotation speed of the high-speed three-phase motor to reduce noise generated due to the high rotation speed and to control the air speed to be in the predetermined air speed range;

wherein the portable fan is arranged with a battery to supply power to the high-speed three-phase motor when the portable fan is being carried by a user.

9. The control method of the portable fan according to claim 8, wherein the air speed is controlled to reach 10 to 100 speed values.

* * * * *